US010907712B2

(12) United States Patent
Bastide et al.

(10) Patent No.: US 10,907,712 B2
(45) Date of Patent: Feb. 2, 2021

(54) ACTUATOR WITH PASSIVE LOCKING

(71) Applicant: SAFRAN ELECTRONICS & DEFENSE, Boulogne Billancourt (FR)

(72) Inventors: Christophe Bastide, Boulogne Billancourt (FR); Pascal Omnes, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 61 days.

(21) Appl. No.: 16/474,926

(22) PCT Filed: Dec. 26, 2017

(86) PCT No.: PCT/EP2017/084592
§ 371 (c)(1),
(2) Date: Jun. 28, 2019

(87) PCT Pub. No.: WO2018/122224
PCT Pub. Date: Jul. 5, 2018

(65) Prior Publication Data
US 2020/0182339 A1 Jun. 11, 2020

(30) Foreign Application Priority Data

Dec. 30, 2016 (FR) ...................................... 16 63571
Dec. 30, 2016 (FR) ...................................... 16 63572
(Continued)

(51) Int. Cl.
*F16H 25/24* (2006.01)
*F02K 1/76* (2006.01)
*F16H 25/20* (2006.01)

(52) U.S. Cl.
CPC ......... *F16H 25/2454* (2013.01); *F02K 1/766* (2013.01); *F16H 25/20* (2013.01)

(58) Field of Classification Search
CPC ....... F16H 25/2454; F16H 25/20; F02K 1/766
See application file for complete search history.

(56) References Cited

U.S. PATENT DOCUMENTS 4,628,752 A * 12/1986 Paxton ................... F16D 59/00
74/411.5
6,240,797 B1 * 6/2001 Morishima ......... F16H 25/2454
188/134
(Continued)

FOREIGN PATENT DOCUMENTS

FR    2 989 740 A1    10/2013
FR    2 993 026 A1    1/2014
FR    3 006 379 A1    12/2014

*Primary Examiner* — David M Fenstermacher
(74) *Attorney, Agent, or Firm* — Muncy, Geissler, Olds & Lowe, P.C.

(57) ABSTRACT

A lockable electromechanical actuator including: a screw extending along a longitudinal axis; a nut engaged on the screw and provided with means for connection to an element that is to be moved; and a passive locking device for locking the element that is to be moved in the retracted position; the passive locking device including a device for actuating a lock that can selectively adopt a first position in which the lock prevents relative turning between the screw and the nut, which would lead to the element that is to be moved being deployed, and a second position in which the nut is free to turn, the lock passing from one of its first and second positions to the other one of its first and second positions when the element that is to be moved is taken beyond its retracted position.

39 Claims, 23 Drawing Sheets

(30) Foreign Application Priority Data

Dec. 30, 2016 (FR) ...................................... 16 63573
Dec. 30, 2016 (FR) ...................................... 16 63574

(56) References Cited

U.S. PATENT DOCUMENTS

| | | | | |
|---|---|---|---|---|
| 2004/0093969 A1* | 5/2004 | Nielsen | .................... | H02K 7/06 |
| | | | | 74/89.23 |
| 2009/0133519 A1* | 5/2009 | Lorenzen | ............ | F16H 25/2454 |
| | | | | 74/89.32 |
| 2011/0073421 A1* | 3/2011 | Jones | ...................... | F16D 67/02 |
| | | | | 188/166 |
| 2013/0264399 A1* | 10/2013 | Wingett | .................. | F02K 1/763 |
| | | | | 239/265.19 |
| 2016/0025199 A1* | 1/2016 | Boone | .................... | B64C 13/50 |
| | | | | 74/89.38 |
| 2018/0335115 A1* | 11/2018 | Hawksworth | ....... | F16H 25/2454 |
| 2019/0093750 A1* | 3/2019 | Matsuto | .................. | F16H 25/20 |
| 2019/0277379 A1* | 9/2019 | Kim | .................... | F16H 25/2204 |
| 2020/0032741 A1* | 1/2020 | Werquin | ............. | F16H 25/2454 |
| 2020/0087001 A1* | 3/2020 | Dyer | ...................... | B64D 29/06 |

* cited by examiner

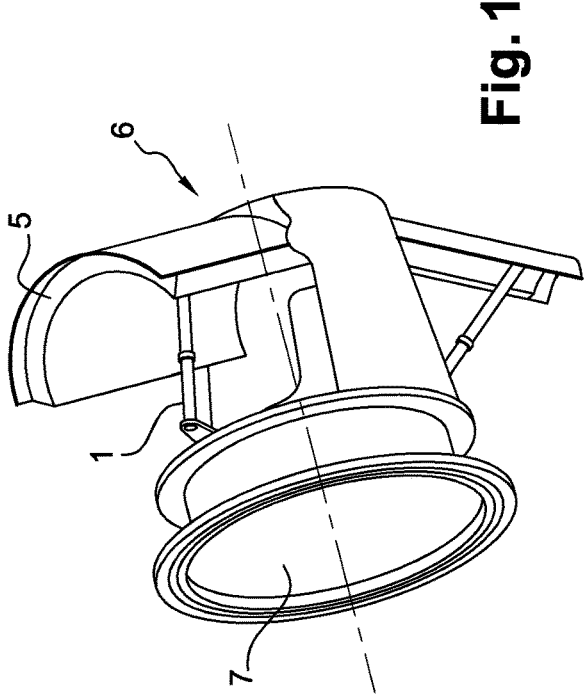
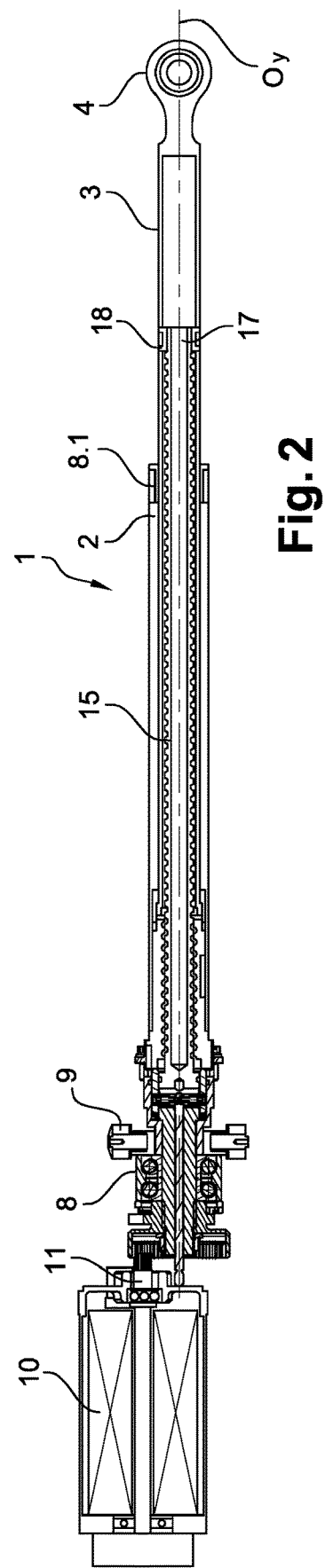
Fig. 1
Fig. 2

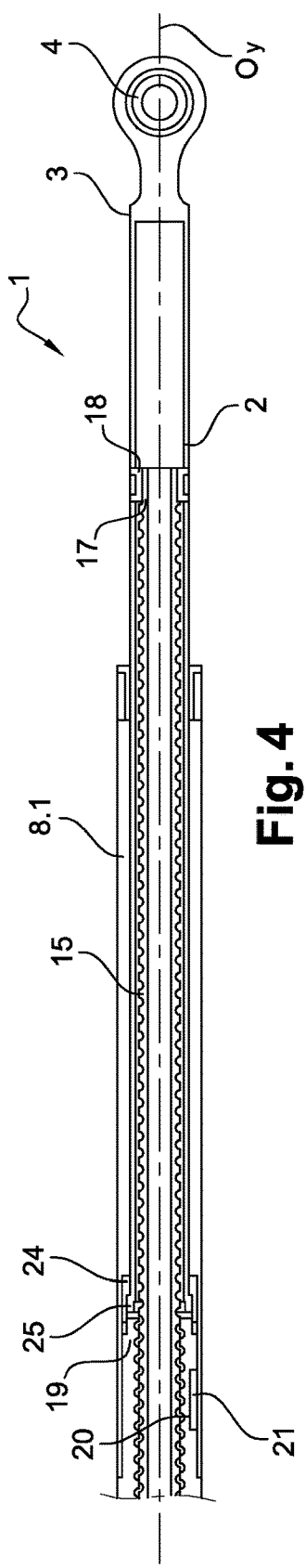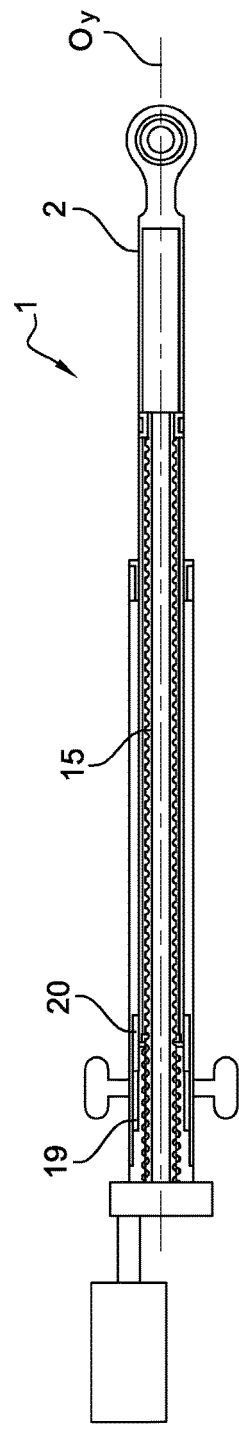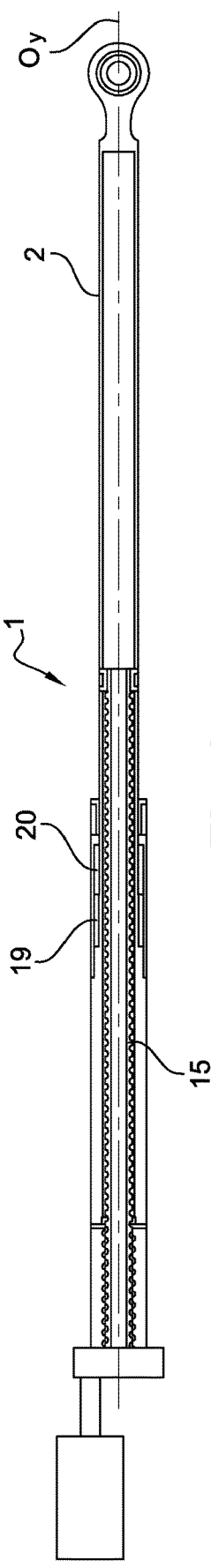

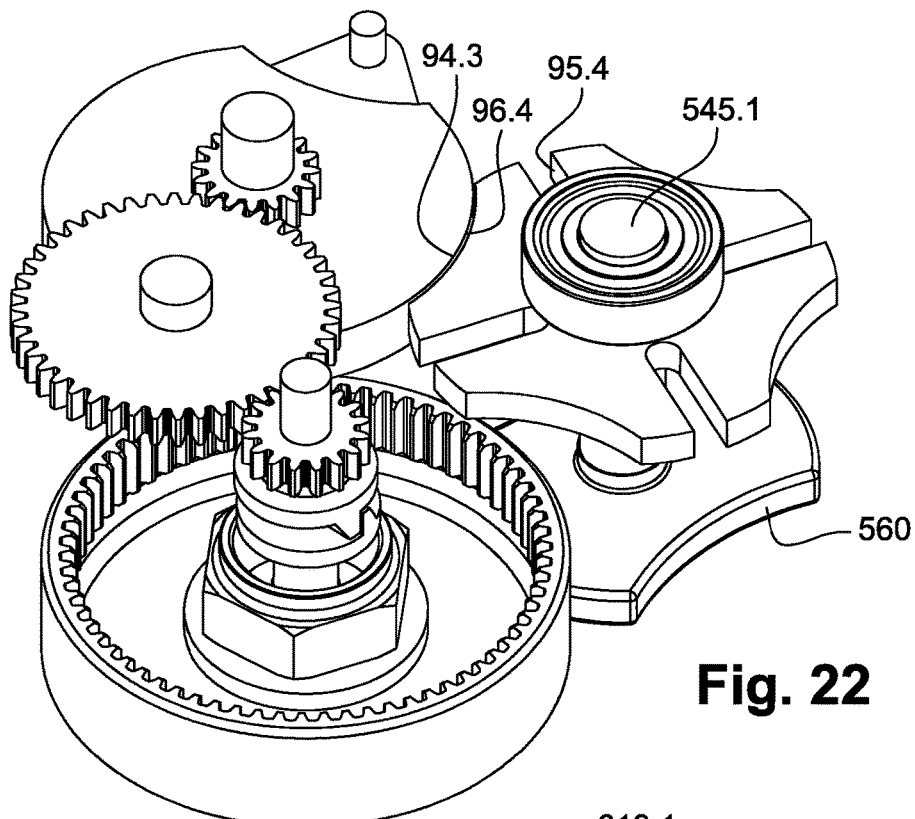
Fig. 22
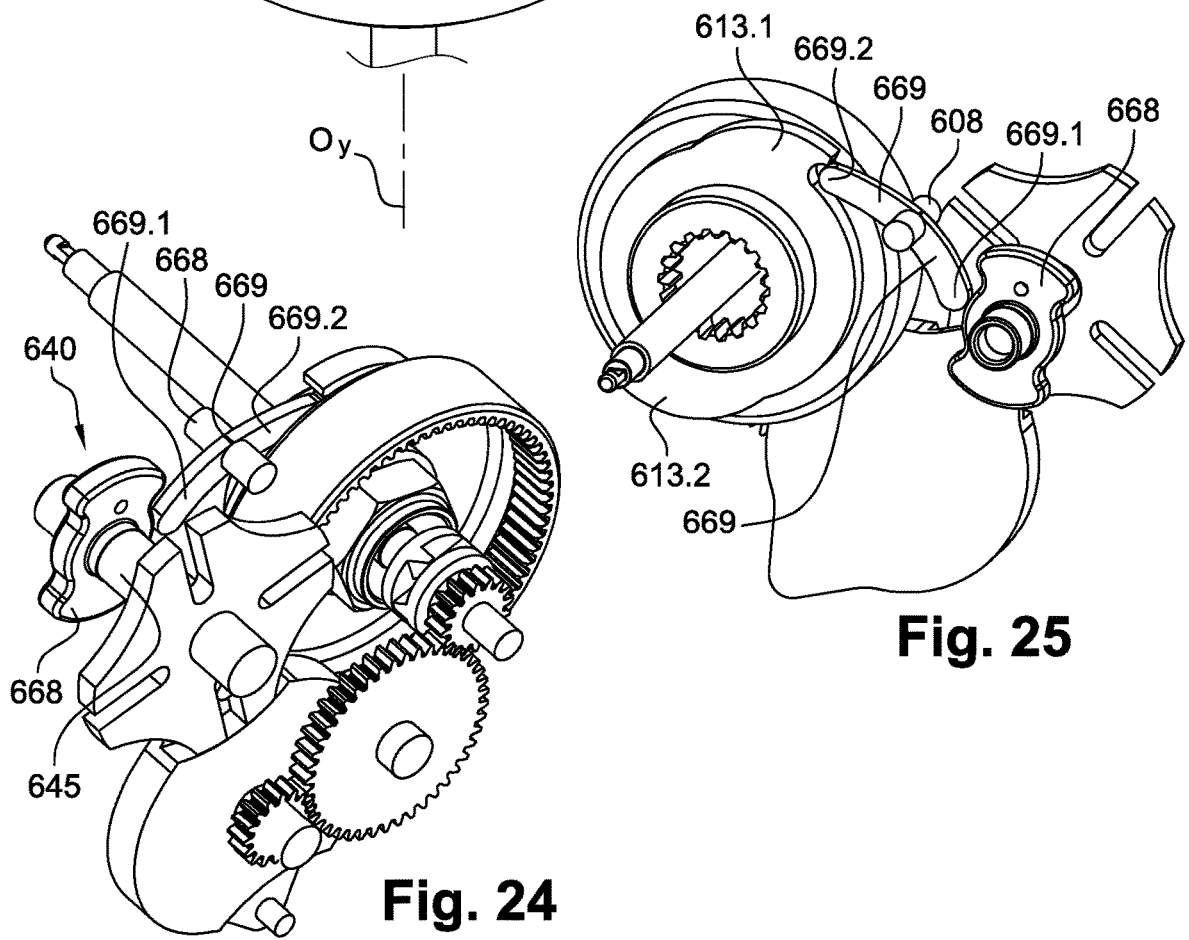
Fig. 25
Fig. 24

ACTUATOR WITH PASSIVE LOCKING

FIELD OF THE INVENTION

The present invention relates to the field of aviation actuators, and more particularly to lockable actuators for thrust reversers of jets, and more particularly, of turbojets.

BACKGROUND OF THE INVENTION

In a conventional turbojet thrust reverser system, the nacelle of the turbojet is provided with movable surfaces that can be deployed so as to deflect towards the front a portion of the gas stream produced by the turbojet. Deploying the movable surfaces thus serves in particular to shorten distances required for landing. Each movable surface is deployed by using an actuator, and it has a main locking device including redundant locks for connecting the movable surface to the nacelle in order to prevent any accidental deployment of the movable surface.

Conventionally, the movable surfaces are moved by means of hydraulic jacks, which have the advantage of remaining in position providing the pressure in the chambers of the jack remains unchanged.

A new generation of actuators for the movable surface has been envisaged, which actuators comprise a mount, an electric motor, possibly with reduction gearing, and a screw constrained to rotate with the outlet shaft of the motor. An extension tube secured to a nut engaged on the screw has one end provided with means for connection to the movable surface, with the tube being mounted to slide in a sheath connected to the body. The extension tube can adopt a retracted position in which the movable surface is closed, and a deployed position in which the movable surface deflects at least a portion of the stream from the jet. Generally, such a hydraulic or electrical actuator possesses retraction overtravel, in order to bring the extension tube beyond its retracted surface and the movable surface beyond its closed position, thus making it possible, by lightly compressing the gasket that co-operates with the movable surface, to facilitate disengaging the locks of the main locking device for the movable surfaces, known as the primary lock system (PLS).

Nevertheless, when the motor of the actuator is no longer powered, any force that is applied directly on the movable surface could move it (impacts, vibration, wrong commands).

The consequences of an undesired deployment of a movable surface of a thrust reverser are classified as catastrophic, so it is desirable to add an additional locking device. Provision has been made to add an additional lock to the movable surface together with a dedicated locking/unlocking actuator. Since the nacelle has a large number of mechanisms, integrating an additional lock-plus-actuator assembly is difficult and gives rise to extra weight. Those elements also need thermal protection, they need to be dimensioned so as to avoid generating vibration, and they need to have a dedicated control system. All of those requirements increase the weight and the size of the equipment, thereby constituting an impediment to using electrical actuators for thrust reversal.

OBJECT OF THE INVENTION

An object of the invention is to reduce the weight and the size of a locking device for locking an element moved by an electromechanical actuator.

SUMMARY OF THE INVENTION

To this end, the invention provides a lockable electromechanical actuator comprising a body, a motor having its outlet shaft constrained to rotate with a screw connected thereto and extending along a longitudinal axis, a nut engaged on the screw and provided with connection means for connection to an element that is to be moved. The nut moves on the screw from a retracted first position of the nut to a deployed second position of the nut corresponding respectively to a retracted first position of the element that is to be moved and to a deployed second position of the element that is to be moved. The electromechanical actuator of the invention also comprises a passive locking device for locking the element that is to be moved in the retracted position. The passive locking device comprises one of the means for actuating a lock being capable of selectively adopting a first position in which the lock prevents relative turning between the screw and the nut that would lead to the element that is to be moved being deployed and a second position in which relative rotation between the screw and the nut is free. The locking device being arranged so that when the lock is in its first position, the lock passes from the first position to the second position when the element that is to be moved is taken beyond its retracted position. The locking device is also arranged so that when the lock is in its second position, the lock passes from the second position to the first position when the element that is to be moved is taken beyond its retracted position.

Thus, changing the state of the additional lock of the actuator does not require a dedicated active actuator (such as a motor or an electromagnet) and is performed using the motor of the actuator. The device is thus naturally compact, and lightweight, and more reliable without having such a dedicated active component and the associated control electronics. In the meaning of the present application, the retraction stroke of the element that is to be moved begins at its deployed position and ends at its retracted position. The retracted position of the element that is to be moved is the position that is adopted nominally when the movable surface is considered to be closed. Moving the element that is to be moved beyond its retracted position corresponds to the element traveling through a distance that is additional to its retraction stroke, thereby further increasing the distance between the element and its deployed position.

Advantageously, the outlet shaft of the motor is provided with a pinion meshing with an internally-toothed ring, and the screw is constrained to rotate with the ring. The passive locking device then has an abutment carried by the ring for the purpose of co-operating with the lock, the lock being functionally connected to the nut. The lock is arranged to prevent the ring turning when the lock is in its first position. Since the lock acts directly on the ring that provides reduction gearing, the forces to which it is subjected are reduced by a factor that is substantially equal to the reduction ratio of the gearing formed by the pinion and the toothed ring. This further improves the weight and the compactness of the passive locking device.

Also advantageously, the actuator means comprise movement conversion means arranged to convert movement of the element that is to be moved beyond its retracted first position into a movement in rotation suitable for causing the lock to pass from one of its first and second positions to the other one of its first and second positions. This conversion serves to provide rotary locks that are more compact, lighter in weight, and that thus require less work to actuate than linear actuators, which, furthermore, are sensitive to vibration and to impacts.

The device is compact and light in weight when the movement conversion means comprise a rod slidably mounted in a central housing of the screw extending along the longitudinal axis, the rod being functionally connected to the element that is to be moved so as to pass from a retracted first position of the rod to a deployed second position of the rod when the element that is to be moved is taken beyond its retracted position. The device is made even more compact when the central housing extends over the entire length of the screw, the rod having a first end projecting from a first end of the screw. Alternatively, the central housing is blind and the rod has a first portion extending in a bore passing through the screw in a direction that is substantially orthogonal to the longitudinal axis, the first portion of the rod being connected to a first bushing slidably mounted on the screw along the longitudinal axis.

The presence of return means returning the rod to its retracted first position provides good linearity to the passive locking device and improves its ability to withstand vibration (stiffness).

In a preferred embodiment, the movement conversion means comprise a lever pivotally mounted on the body, the lever having a first end arranged to be actuated by the rod when it passes into its deployed second position. The use of such a lever is particularly appropriate when the second end of the lever is arranged to move a second bushing slidably mounted on a first shaft that is constrained to turn with the lock.

Preferably, the first shaft has a groove extending helically along the first shaft, and the second bushing is secured to a first cylindrical ferrule provided with a follower for co-operating with the groove and a keeper arranged in such a manner that:

movement of the second bushing on the first shaft in a first travel direction causes the first shaft to turn relative to the second bushing; and movement of the second bushing on the first shaft in a second travel direction opposite to the first travel direction does not cause any turning of the first shaft relative to the second bushing. The reactivity of such an actuator is improved when it comprises first return means for returning the second bushing into position.

An additional improvement in the reactivity of the passive locking device occurs when the follower and the groove are arranged in such a manner that movement of the second bushing on the first shaft in the first sliding direction causes the first shaft to turn through 90° relative to the bushing. Alternatively, the follower and the groove are arranged in such a manner as to cause the lock to pass selectively from one of its first and second positions to the other one of its first and second positions when the first shaft turns through 180°.

Alternatively, the movement conversion means may equally well comprise a plunger rotatably mounted on the first shaft and having a first end of the plunger that co-operates with a first end of a cam body connected to the first shaft by a slideway type connection. The outer face of the plunger includes at least one groove co-operating with a stop secured with the second bushing, the movement conversion means also comprising first return means for returning the second bushing into position, together with thrust means for thrusting the cam body so as to bring the first end of the cam body against the first end of the plunger.

Preferably, the movement conversion means are arranged to convert a movement of the element that is to be moved beyond its retracted position into a turning movement of the rod. This kind of movement conversion is advantageously used when the rod is functionally constrained in rotation with a pinion of gearing driving a drive wheel having at least one finger for co-operating with a slot of a driven wheel of the Maltese cross type, the driven wheel being constrained to rotate with the lock. Good reliability is obtained when the driven wheel has four slots and the drive wheel has two fingers. The position of the lock is effectively blocked when the portion of the driven wheel between two successive slots describes a concave rounded curve for co-operating with a corresponding portion of the drive wheel while it is turning.

A particularly inexpensive embodiment is obtained when the slideway type connection comprises a pin extending through a longitudinal opening in the first shaft. The reactivity of the locking device is improved when the first return means of the bushing and/or the means for thrusting the cam body comprise a helical spring.

Alternatively, the lock comprises a cam wheel secured to the first shaft and acting on the first end of a latch pivotally mounted on the body and having its first end co-operating selectively with the abutment.

Also preferably, the lock is constrained to rotate with the first shaft and has at least one convex portion for co-operating with the abutment when the lock is in its first position and a concave portion arranged to leave the ring free to turn when the lock is in its second position. Advantageously, the convex portion is a portion of a disk having its center situated on the axis of rotation of the first shaft.

The reliability of the locking device is further improved when the actuator includes detector means for detecting the position of the lock.

The device is made compact and light in weight when the actuator means comprise a slide mounted to slide in a central housing of the screw extending along the longitudinal axis, the slide being functionally connected to the element that is to be moved in such a manner as to pass from a deployed first position of the slide to a retracted second position of the slide when the element to be moved is taken beyond its retracted position. Compactness is further improved when the slide comprises a first portion extending in a bore crossing the screw in a direction that is substantially orthogonal to the longitudinal axis, the first portion of the rod being connected to a first bushing slidably mounted on the screw to slide along the longitudinal axis.

Preferably, the actuator comprises return means for returning the slide towards its deployed first position and arranged to hold the slide in its retracted second position for a predetermined duration prior to returning the slide towards its deployed first position.

Advantageously, the slide comprises at least one frusto-conical portion. Good reactivity for the lock is obtained when the lock includes at least one ball.

Advantageously, the lock is arranged to constrain the nut to rotate with the screw when the nut is in its first position.

Other characteristics and advantages of the invention appear from reading the following description of non-limiting embodiments of the invention.

BRIEF DESCRIPTION OF THE DRAWINGS

Reference is made to the accompanying figures, in which:
FIG. 1 is a diagrammatic perspective view of a thrust reverser provided with an actuator of the invention;

FIG. 2 is a diagrammatic section view of an actuator of the invention;

FIG. 4 is a fragmentary diagrammatic view in section of a first embodiment of the actuator of the invention in a retracted position;

FIG. 5 is a diagrammatic view of a first embodiment of the actuator of the invention in a retracted position;

FIG. 6 is a diagrammatic view of a first embodiment of the actuator of the invention in a deployed position;

FIG. 22 is a diagrammatic detail view in perspective of a passive locking device in a sixth embodiment of the invention, the passive locking device being in a first position;

FIG. 24 is a diagrammatic detail view in perspective of a passive locking device in a seventh embodiment of the invention, the passive locking device being in a first position;

FIG. 25 is a view identical to the view of FIG. 24, seen from a different angle;

DETAILED DESCRIPTION OF THE INVENTION

Figure 3:
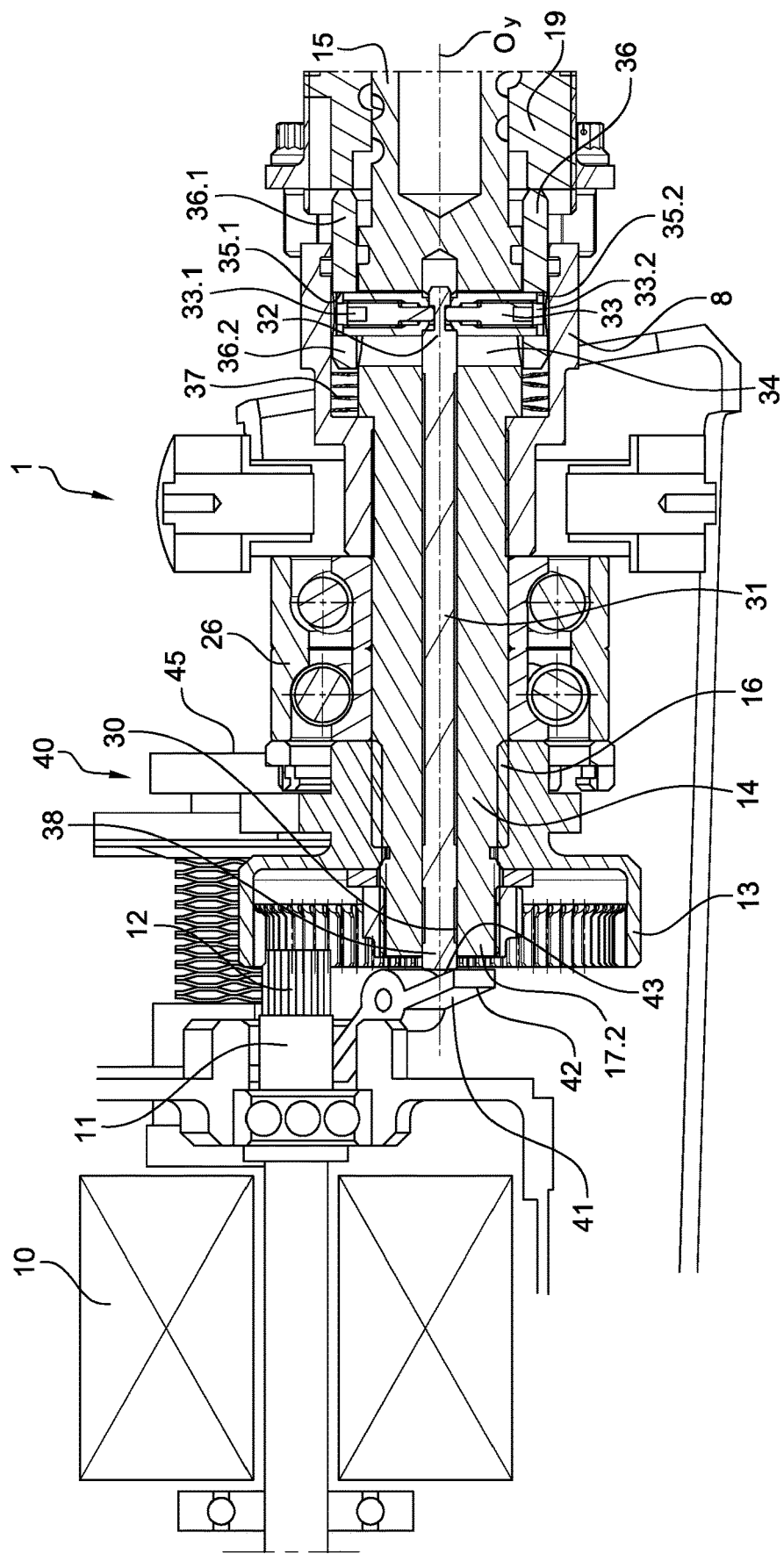
FIG. 3 is a fragmentary section view of a first embodiment of the actuator of the invention in a retracted position.

With reference to FIGS. 1 to 16, the electromechanical actuator of the invention, given overall reference 1, comprises an extension tube 2 having a first end 3 with a ball clevis 4 connected to a movable surface 5 of a thrust reverser 6 of a nacelle 7. The body 8 of the actuator 1 comprises a universal joint 9 hinging the actuator 1 to the nacelle 7 and a sheath 8.1 in which the extension tube 2 slides between a retracted first position (shown in FIG. 5) and a deployed second position (shown in FIG. 6).

The actuator 1 also has a motor 10 with an outlet shaft 11 provided with a pinion 12 meshing with an internally-toothed ring 13. A fluted first end 14 of a tubular ball screw 15 is mounted in a splined central bore 16 of the ring 13. The screw extends along a longitudinal axis Oy and it possesses a second end 17 provided with a bronze ferrule 18 co-operating with the inside of the extension tube 2 in order to guide sliding along the longitudinal axis Oy. A ball nut 19 is engaged on the screw 15. A first groove 20 made in the outside face 21 of the nut 19 receives a bronze key 22 that co-operates with a second groove 23 of the sheath 8.1, thereby preventing the nut 19 from turning relative to the screw 15. The first end 19.1 of the nut 19 includes an internally chamfered internal groove 19.2 and the second end 19.3 of the nut 19 is connected by a connection hook 24 to a second end 25 of the extension tube 2.

The screw 15 is mounted to rotate relative to the body 8 by means of a bearing 26. Thus, the motor 10 rotating in one direction or the other serves to move the nut 19 along the screw 15 from a retracted first position of the nut 19 to a deployed second position of the nut 19 corresponding respectively to the retracted position of the extension tube 2 (shown in FIG. 5) and to a deployed position of the extension tube 2 (shown in FIG. 6).

As shown in FIG. 3, the first end 14 of the screw 15 has a blind central housing 30 extending along the longitudinal axis Oy in which a rod 31 is slidably mounted. At its first end 32, the rod 31 has a first portion 33 extending in a bore 34 passing through the screw 15 in a direction substantially orthogonal to the longitudinal axis Oy. The top and bottom ends 33.1 and 33.2 (in the orientation shown in FIG. 3) are fitted respectively in top and bottom bores 35.1 and 35.2 in a first bushing 36 mounted to slide along the longitudinal axis Oy on the screw 15. As can be seen in FIG. 3, the bushing 36 has a first end 36.1 against which the nut 19 comes into contact when it is in its retracted first position. A helical compression spring 37 extends between the body 8 and the second end 36.2 of the first bushing 36.

Figure 7:
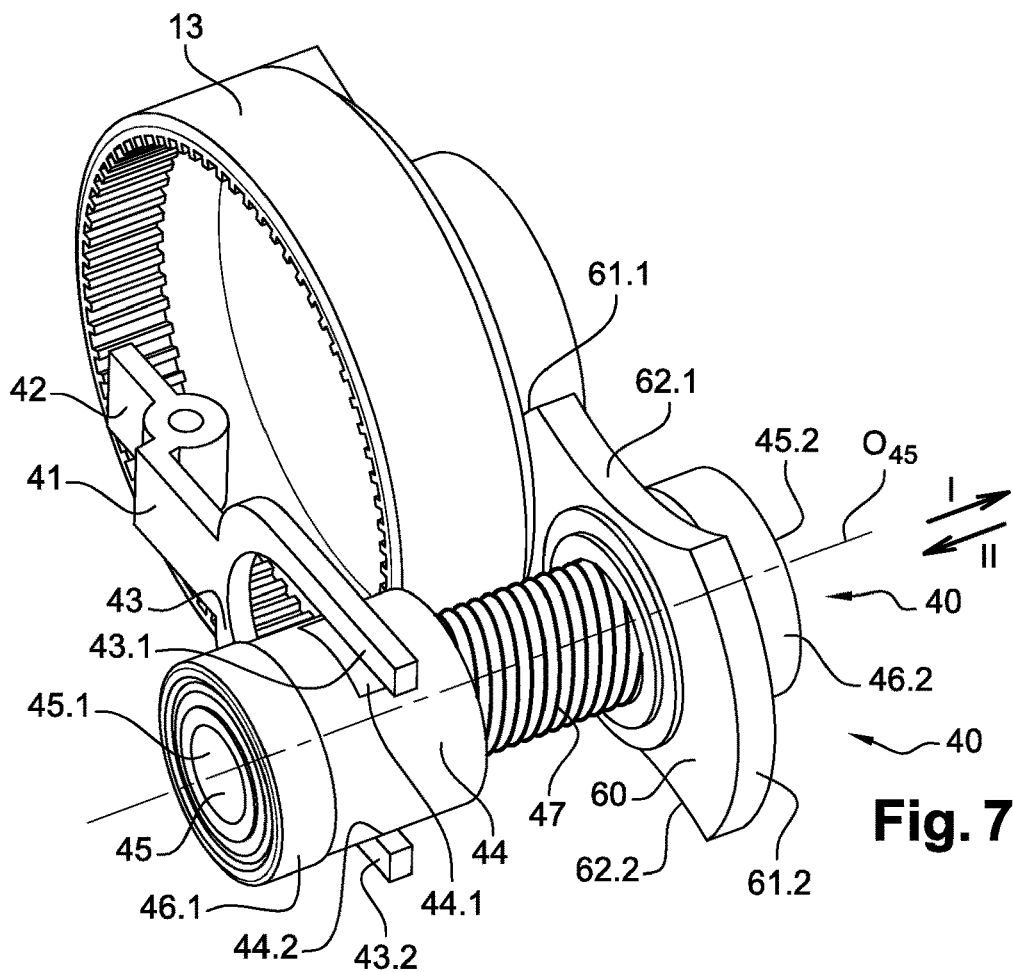
FIG. 7 is a diagrammatic detail view in perspective of a passive locking device in the first embodiment of the invention, the passive locking device being in a first position.
Figure 8:
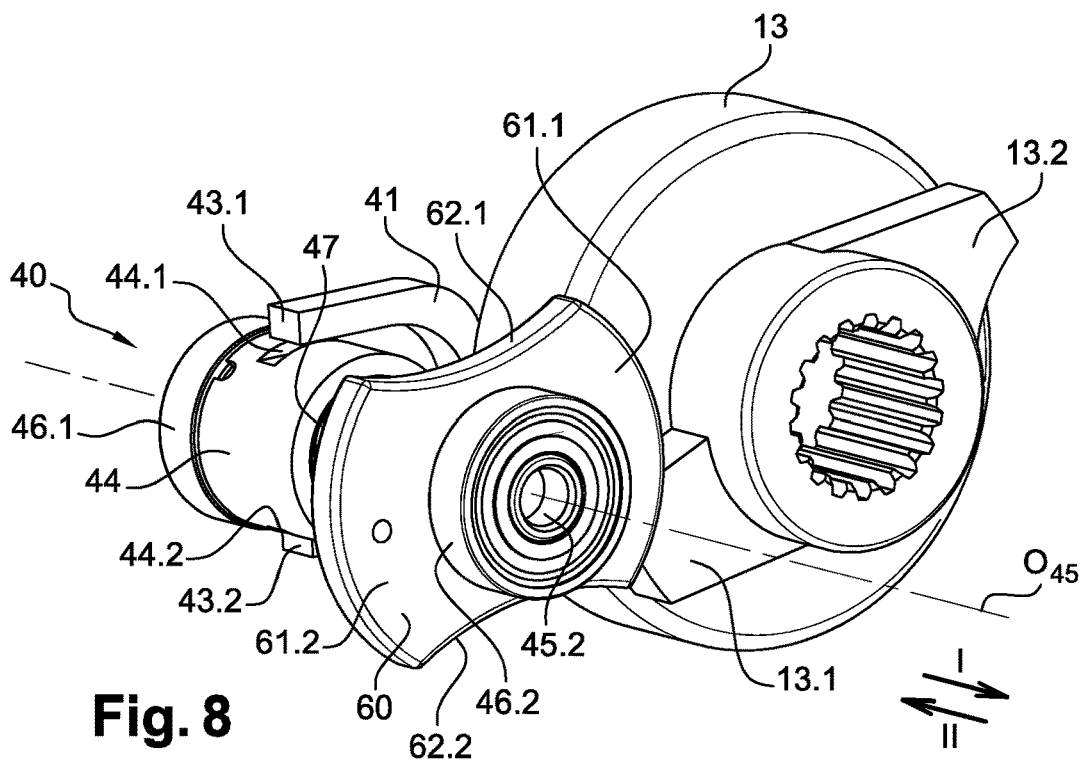
FIG. 8 is a view identical to the view of FIG. 7, seen from a different angle.
Figure 9:
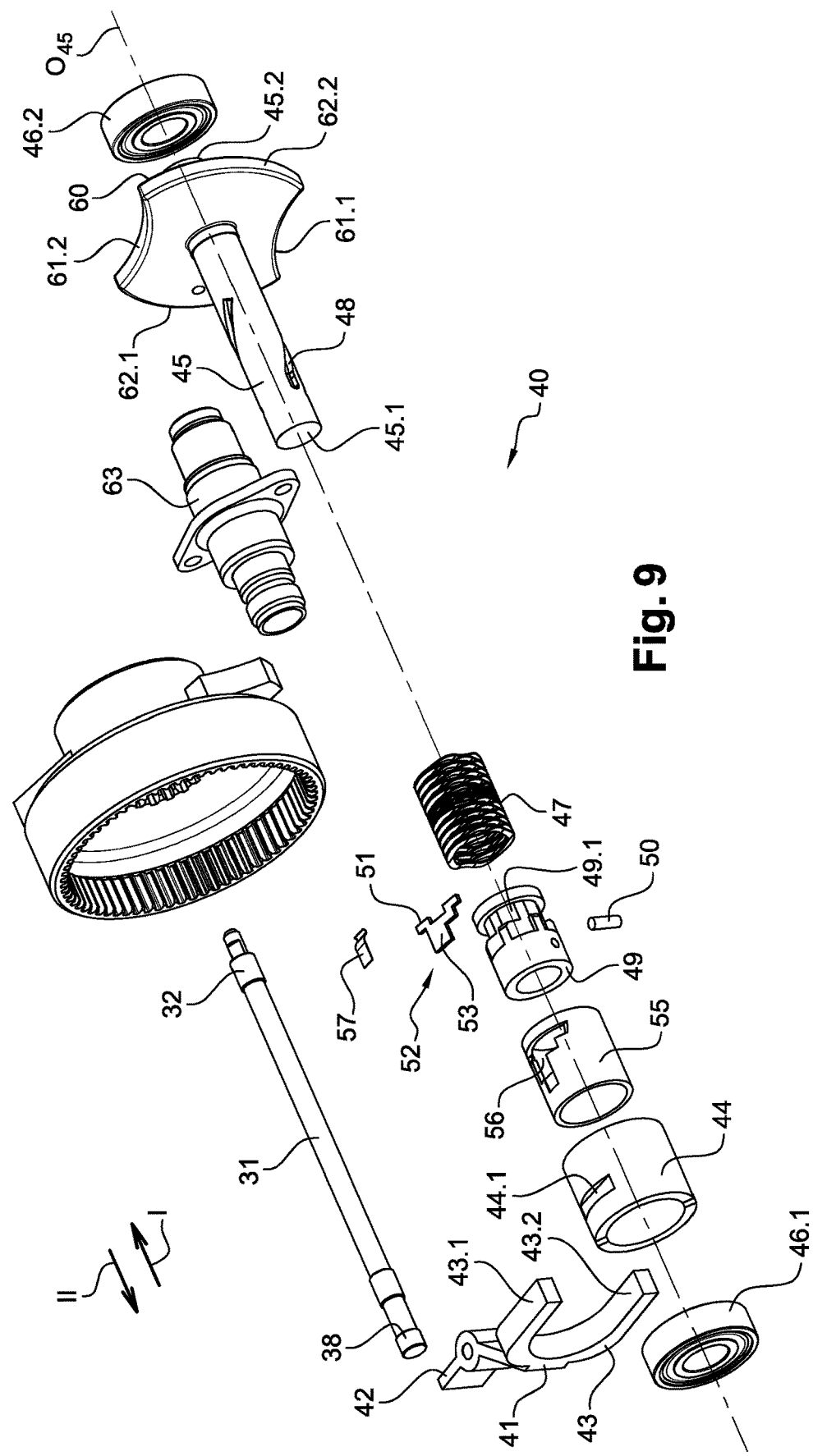
FIG. 9 is an exploded perspective view of the FIG. 7 passive locking device.
Figure 10:
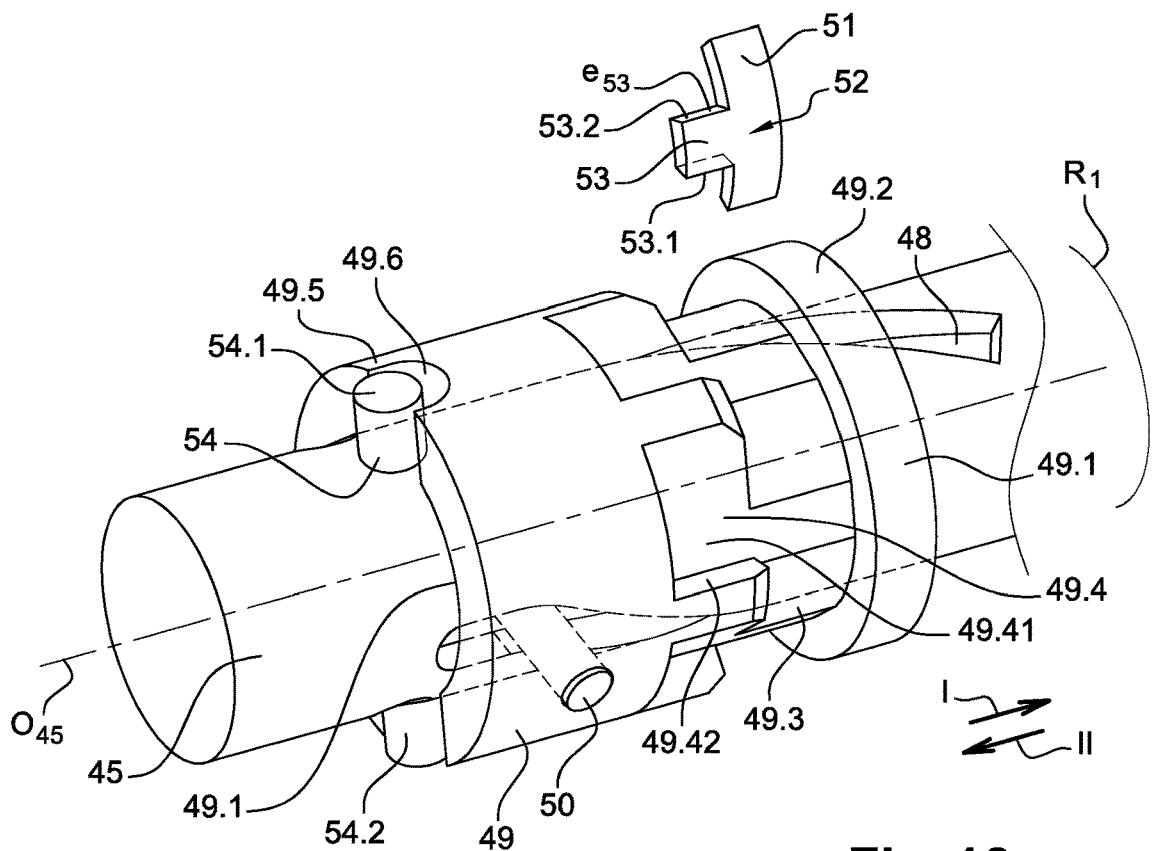
FIG. 10 is a fragmentary perspective detail view of the FIG. 7 passive locking device.

As can be seen in FIGS. 7 to 9, the actuator 1 has a passive locking device 40 for locking the tube 2 in the retracted position. In addition to the rod 31, this device 40 comprises a lever 41 pivotally mounted on the body 8 and having a first end 42 facing a second end 38 of the rod 31. A second end 43 of the lever 41 is fork-shaped with two tines 43.1 and 43.2 that are received respectively in two transverse grooves forming first and second flats 44.1 and 44.2 on the outer surface of a second bushing 44 slidably mounted on a first end 45.1 of a first shaft 45. The first and second flats 43.1 and 43.2 also prevent the second bushing 44 from turning relative to the first shaft 45 about the axis $O_{45}$ of the first shaft 45. The first shaft 45 is rotatably mounted relative to the body 8 by means of two bearings 46.1 and 46.2 respectively mounted on its first and second ends 45.1 and 45.2. The second end 45.2 of the first shaft is constrained in rotation with a lock 60 arranged to co-operate with one or the other of two abutments 13.1 and 13.2 carried by the ring 13.

In the meaning of the present application, an abutment 13.1 or 13.2 is carried by the ring 13 when removing the ring 13 means that the abutment 13.1 or 13.2 is also removed or that the mechanical connection between the abutment 13.1 or 13.2 and the actuator 1 will be absent.

Figure 12:
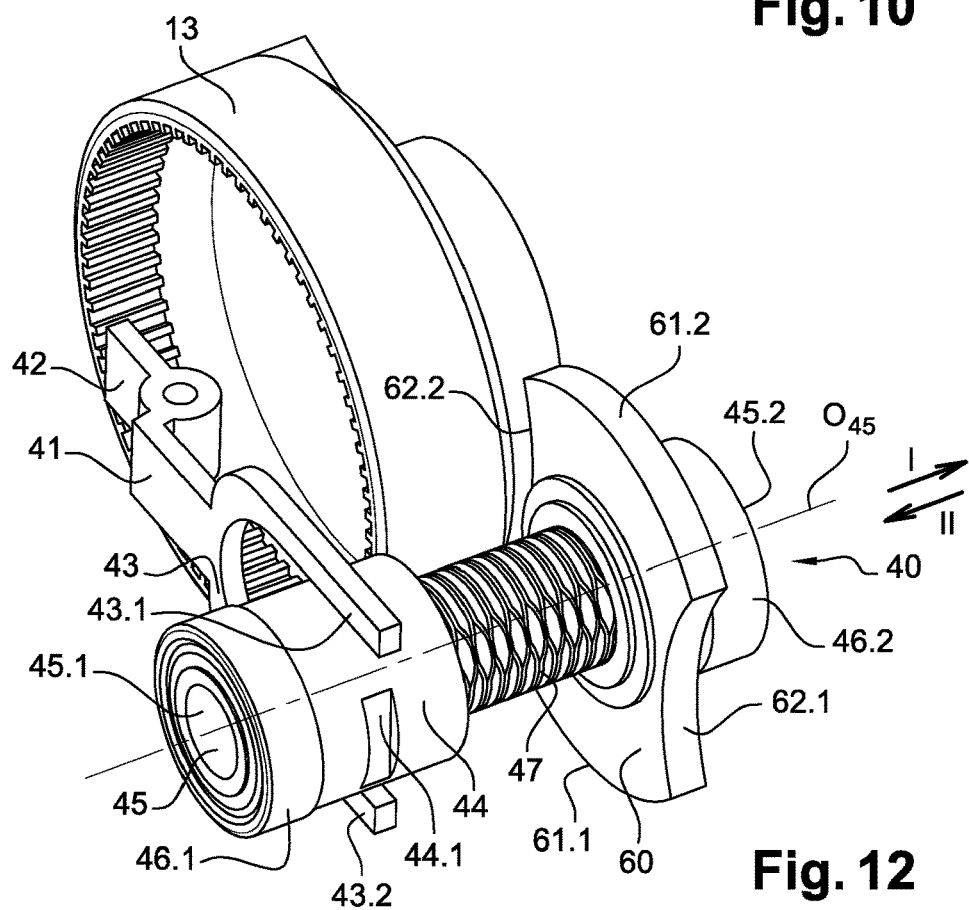
FIG. 12 is a view identical to the view of FIG. 7 showing the locking device in a second position.

In this example, the lock 60 comprises two diametrically opposite convex portions 61.1 and 61.2 that are for co-operating in alternation with one or the other of the abutments 13.1 or 13.2 when the lock 60 is in a first position for locking the ring 13 (shown in FIGS. 7 and 8). In this example, the convex portions 61.1 and 61.2 are portions of a disk with its center situated on the axis of rotation $O_{45}$ of the first shaft 45. The lock 60 also has two diametrically opposite concave portions 62.1 and 62.2 that are interposed between the portions 61.1 and 61.2. The portions 62.1 and 62.2 are arranged to leave the ring 13 free to turn when the lock 60 is in its second position, as shown in FIG. 12. Thus, the first shaft 45 turning through 90° about its axis of rotation $O_{45}$ causes a change in the state of the lock 60, i.e. it causes the lock 60 to pass from one of its first and second (or locked and unlocked) positions to the other one of its first and second (or locked and unlocked) positions. The device 40 also has a helical spring 47 bearing firstly against the lock 60 and secondly against the second bushing 44 and against a groove 48 that extends helically on the first shaft 45. The second bushing 44 has a first cylindrical ferrule 49 secured to the second bushing 44 with its inside surface 49.1 provided with a follower finger 50 projecting from the inside surface 49.1 in order to co-operate with the groove 48. As can be seen more particularly in FIG. 10, the first end 49.2 of the first ferrule 49 has a peripheral slot 49.3 for receiving a pivot 51 of a keeper 52 into which there lead four flats 49.4 for receiving a keeper finger 53 extending along the axis $O_{45}$. Each flat 49.4 has a face 49.41 extending in a plane that is tangential to the first ferrule 49 at the point under consideration and a second face 49.42 extending in a plane containing the axis $O_{45}$. The keeper finger 53 has first and second flanks 53.1 and 53.2 extending parallel to the axis $O_{45}$ and is of thickness $e_{53}$ greater than the height of the second face 49.42 of the first ferrule 49.

The second end 49.5 of the first ferrule 49 also has two diametrically opposite notches 49.6 for co-operating with the two ends 54.1 and 54.2 of a pin 54 that projects from the first shaft 45. The pin 54 serves in particular to avoid any risk of the lock 19 turning as a result of vibration during a stage of flight.

A cylindrical jacket 55 extends around the first ferrule 49 and includes a window 56 for receiving the keeper 52 and a spring blade 57 for returning the keeper finger 53 towards the axis $O_{45}$ of the first shaft 45. When the second ferrule 44 is moved on the first shaft 45 in a first travel direction referenced I (in this example from the first end 45.1 of the first shaft 45 towards the second end 45.2 of the first shaft 45), the follower finger 50 of the first ferrule 49 causes the first ferrule 49 to turn relative to the first shaft 45 in a first direction of rotation. The face 49.42 of the flat 49.4 comes into contact with the first flank 53.1 of the keeper finger 53 and the second flank 53.2 of the keeper finger 53 comes into abutment against a wall of the window 56, thereby constraining the third ferrule 49 and the second bushing 44 together in rotation. The movement of the second bushing 44 on the first shaft 45 in the first travel direction I then causes the first shaft 45 to turn through 90° in a counterclockwise direction as seen in FIG. 9. Conversely, during movement of the second bushing 44, under drive from the spring 47, in a second travel direction referenced II (in this example from the second end 45.2 of the first shaft 45 towards the first end 45.1 of the first shaft 45), the follower finger 50 of the first ferrule 49 causes the first ferrule 49 to turn relative to the first shaft 45 in a second direction of rotation opposite to the first. The keeper finger 53 is raised by the outside face of the first ferrule 49 against the force of the spring 57, thereby releasing the first ferrule 49 to turn relative to the second bushing 44 in the second direction of rotation. The movement of the second bushing 44 on the first shaft 45 in the second travel direction II then causes the first ferrule 49 to turn relative to the second bushing 44 through 90° in a clockwise direction as shown in FIG. 9, and this movement does not give rise to any turning of the second shaft 44. An inductive sensor 63 connected to a control unit (not shown) detects the presence of one of the portions 61.1 or 61.2 in order to determine whether the lock 60 is in its first position or its second position. The lock 60 is functionally connected to the nut 19 by the drive system comprising in particular the first bushing 36, the rod 31, and the elements of the passive locking device 40.

The rod 31, the lever 41 together with the second bushing 44, and the groove 48 of the passive locking device 40 constitute movement conversion means arranged to convert a movement of the tube 2 beyond its retracted first position into a turning movement suitable for causing the lock 60 to go from one of its locked first position or unlocked second position to the other one of its locked first position or unlocked second position.

When the tube 2 is in its deployed second position (FIG. 6), the spring 37 urges the first bushing 36 into a deployed position in which the portion 33 of the rod 31 is held in abutment against a portion of the wall of the bore 34 opposite from a second end 17 of the screw 15. When the first bushing 36 is in this deployed first position, the rod 31 is in a retracted first position in which the second end 38 of the rod 31 is substantially flush with the first end 14 of the screw 15. The lock 60 is in its second position and leaves the ring 13 free to rotate.

Figure 11:
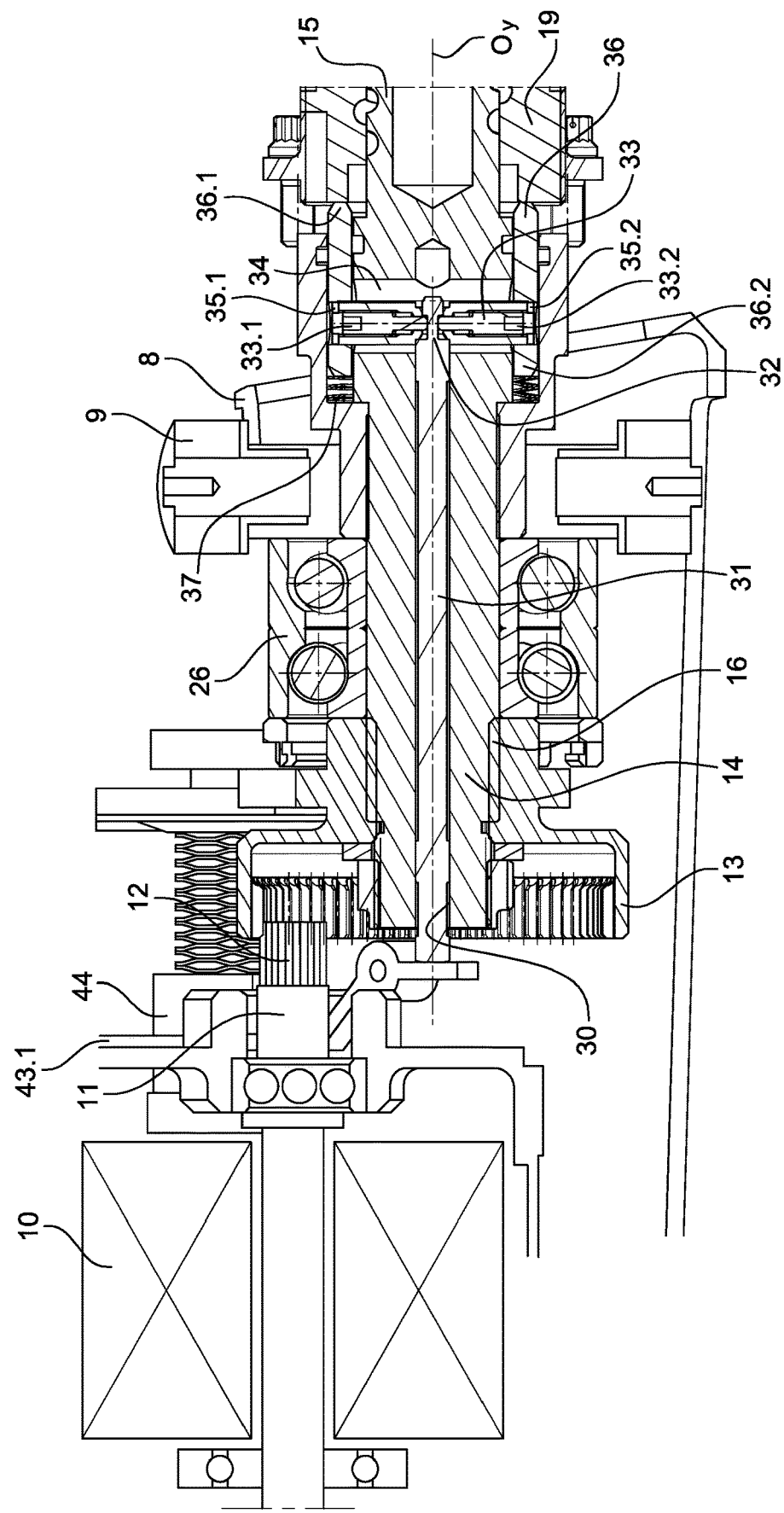
FIG. 11 is a fragmentary diagrammatic view in section of a first embodiment of the actuator of the invention in a retraction overtravel position.

When the electric motor 10 is operated to bring the extension tube 2 to its retracted first position (FIGS. 3 and 5), the nut 19 comes into contact with the first end 36.1 of the first bushing 36. Thereafter, the electric motor 10 is operated to move the extension tube 2 beyond its retracted first position—i.e. towards a retraction overtravel third position, and the nut 19 moves towards the left as shown in FIG. 11, thereby causing the first bushing 36 to move in translation against the force of the spring 37. During this movement, the rod 31 goes from its retracted first position (shown in FIG. 3) to its deployed second position (shown in FIG. 11) and actuates the second end 42 of the lever 41, thereby causing the second bushing 44 to move on the first shaft 45 in the first travel direction I. This movement of the second bushing 44 causes the first shaft 45 to turn and brings the lock 60 from its unlocked second position to its locked first position. The convex portion 61.1 of the lock 60 then faces the ring 13. In parallel, the control unit actuates closure of the main locking system for locking the movable surface.

When the electric motor 10 is operated to bring the extension tube 2 from its retraction overtravel third position to its retracted first position, the first bushing 36 returns to its deployed position under effect of the spring 37, and the rod 31 comes into abutment against the wall portion of the bore 34 that is opposite from the second end 17.2 of the screw 15. The rod 31 moves into its retracted first position as shown in FIG. 3 and releases the first end 42 of the lever 41, thereby causing the second bushing 44 to return towards its initial position as shown in FIG. 7. The lock 60 remains in its first position for locking the ring 13 under the effect of the keeper 52, and the abutment 13.1 rests against the convex portion 61.1 of the lock 60, thereby preventing the ring 13 from turning, which would cause the tube 2 to be deployed (situation shown in FIGS. 7 and 8). The movable surface 5 is locked in the closed position by the main lock system and by the passive locking device 40.

When it is desired to deploy the actuator 1, the electric motor 10 is caused to rotate so as to move the tube 2 beyond its retracted first position—i.e. towards its retraction overtravel third position, and the nut 19 moves to the left as shown in FIG. 11, thereby causing the first bushing 36 to move in translation against the force of the spring 37. This rotation of the motor 10 also moves the abutment 13.1 away from the portion 61.1 of the lock 60, thereby facilitating its disengagement. During the movement of the nut 19, the rod 31 goes from its retracted first position (shown in FIG. 3) to its deployed second position (shown in FIG. 11) and it actuates the second end 42 of the lever 41, thereby causing the second bushing 44 to move on the first shaft 45 in the first travel direction I. This movement of the second bushing 44 causes the first shaft 45 to turn and brings the lock 60 from its locked first position in which the convex portion 61.1 faces the ring 13 to its unlocked second position in which the concave portion 62.1 of the lock 60 leaves the ring 13 free to turn (situation shown in FIG. 12). The actuator 1 is then unlocked and it can be deployed. When the tube 2 returns from its retraction overtravel third position to its retracted first position, the keeper 52 holds the lock 60 in its second position.

This produces an actuator 1 having a passive locking device that changes state when the tube 2 is taken beyond its retracted position. In the meaning of the present application, the locking device is said to be "passive" since the change of state of the lock does not require a dedicated actuator, thereby leading to a device that is more compact, more reliable, and lighter in weight.

Elements that are identical or analogous to those described above are given numerical references that are respectively increased by one, two, three, four, five, six, and seven hundred in the description below of the second, third, fourth, fifth, sixth, and eighth embodiments of the invention.

Figure 13:
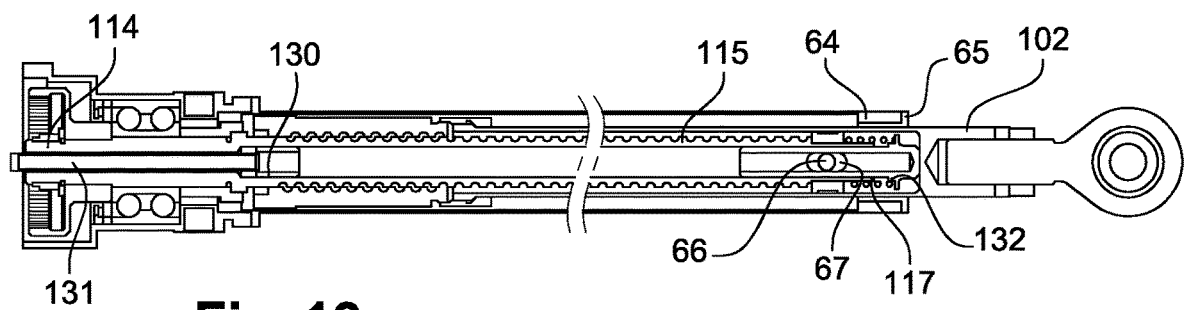
FIG. 13 is a fragmentary diagrammatic view in section of a second embodiment of the invention.

With reference to FIG. 13, and in a second embodiment of the invention, the central housing 130 extends over the entire length of the screw 115 from its first end 114 all the way to its second end 117. The rod 131 extends in the central housing 130 and has a first end 132 that projects from the first end 117 of the screw 115. A helical spring 64 extends between the second end 117 of the screw 115 and a stop ferrule 65 secured to the first end 132 of the screw 115. The spring 64 serves to return the rod 131 to its retracted first position. A shaft 66 secured to the screw 115 extends through an opening 67 in the rod 131 in order to limit its stroke under the effect of the spring 64.

The rod 131, the lever 141 together with the second bushing 144, and the groove 148 of the passive locking device 140 constitute movement conversion means arranged to convert a movement of the tube 102 beyond its retracted first position into a turning movement suitable for causing the lock 160 to go from one of its locked first position or unlocked second position to the other one of its locked first position or unlocked second position.

Figure 14:
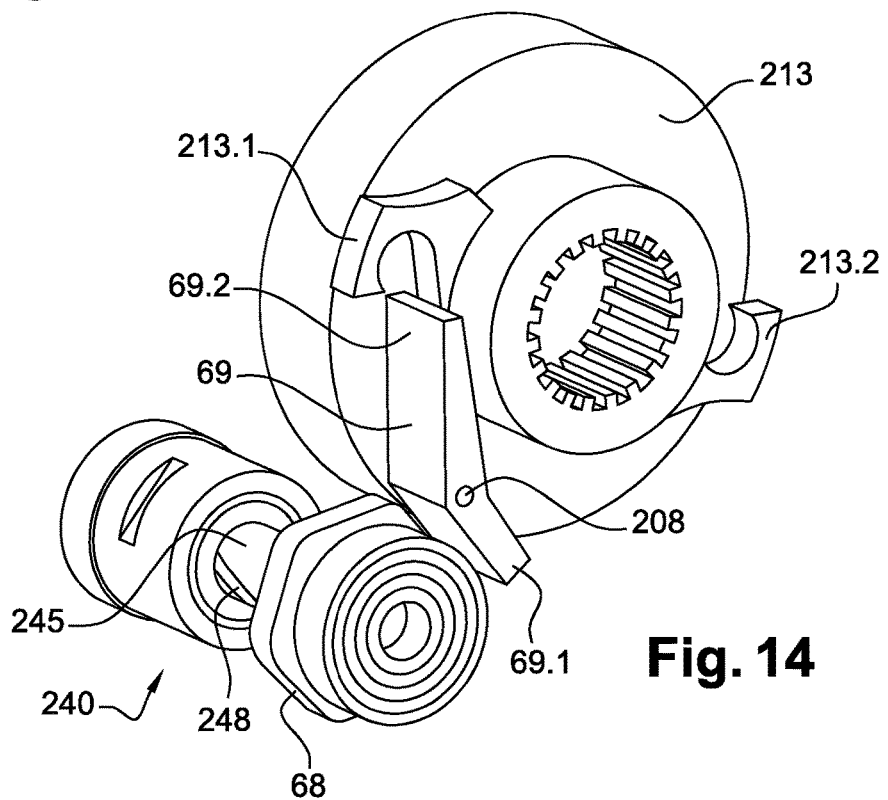
FIG. 14 is a fragmentary diagrammatic view in perspective of a third embodiment of the invention.

With reference to FIG. 14, and in a third embodiment of the invention, the passive locking device 240 comprises a cam wheel 68 secured to the first shaft 245 and acting on the first end 69.1 of a latch 69 pivotally mounted on the body 208 and having a second end 69.2 co-operating selectively with the abutment 213.1 or 213.2 of the ring 213. The cam 68 and the helical groove 248 are arranged so as to cause the lock 260 to pass selectively from one of its first and second positions to the other one of its first and second positions when the first shaft 245 turns through 30°.

The rod 231, the lever 241 together with the second bushing 244, the groove 248, and the cam 68 of the passive locking device 240 constitute movement conversion means arranged to convert a movement of the tube 202 beyond its retracted first position into a turning movement suitable for causing the lock 260 to pass from one of its locked first position or unlocked second position to the other one of its locked first position or unlocked second position.

Figures 15, 16:
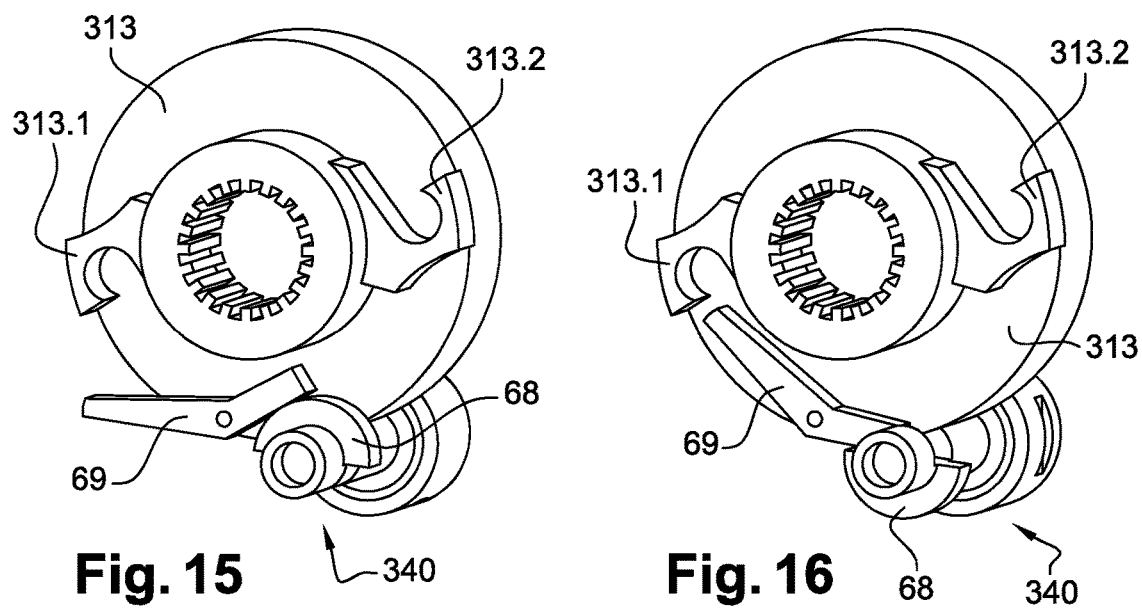
FIG. 15 is a fragmentary diagrammatic view in perspective of a fourth embodiment of the invention in a first position.
FIG. 16 is a fragmentary diagrammatic view in perspective of the FIG. 15 embodiment in a second position.

FIGS. 15 and 16 show a fourth embodiment of the invention in which the cam 68 and the helical groove 348 are arranged so as to cause the lock 360 to pass selectively from one of its first and second positions to the other one of its first and second positions when the shaft 345 turns through 180°.

Figure 17:
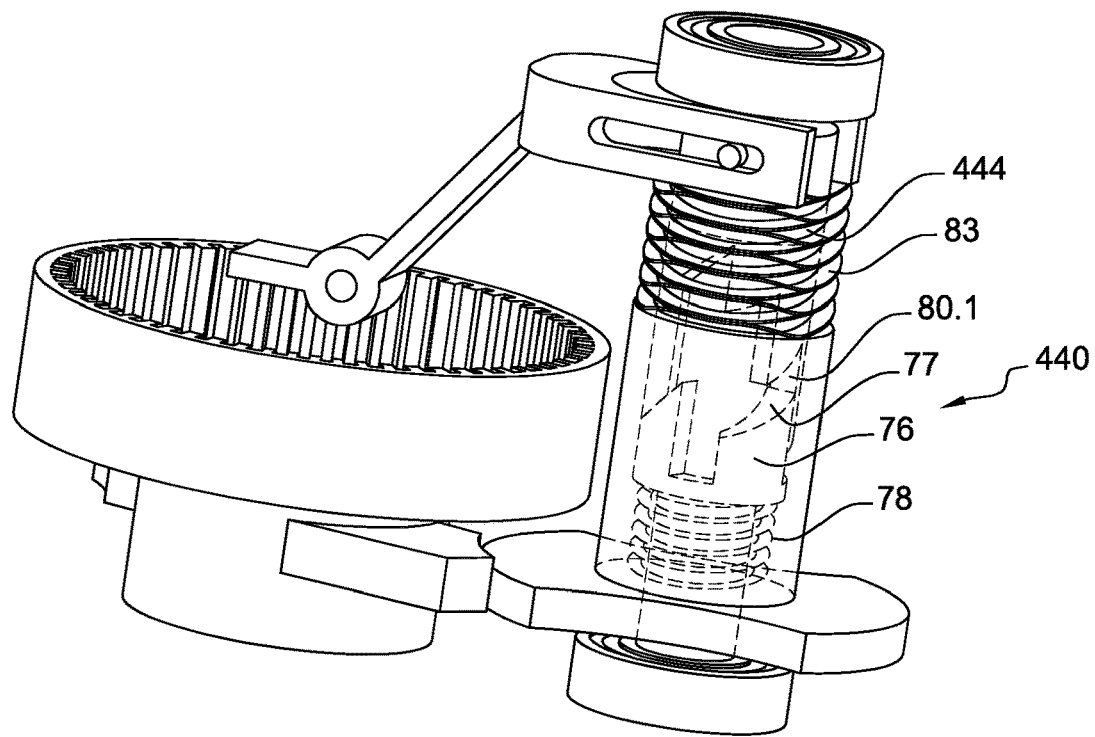
FIG. 17 is a fragmentary diagrammatic view in perspective of a fifth embodiment of the invention in a first position.
Figure 19:
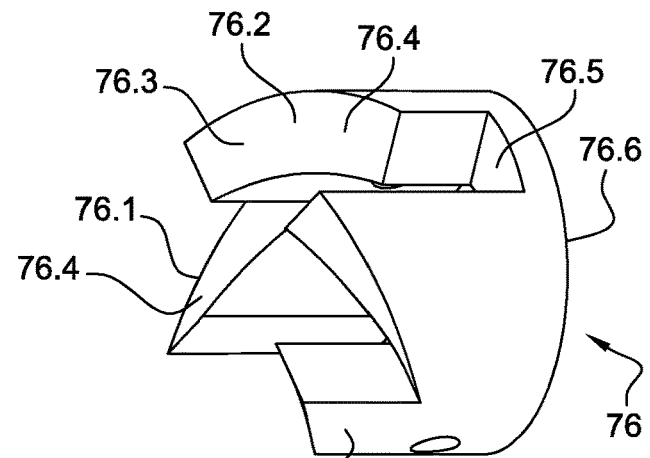
FIG. 19 is a detail view in perspective of a cam body of the FIG. 17 embodiment.
Figure 20:
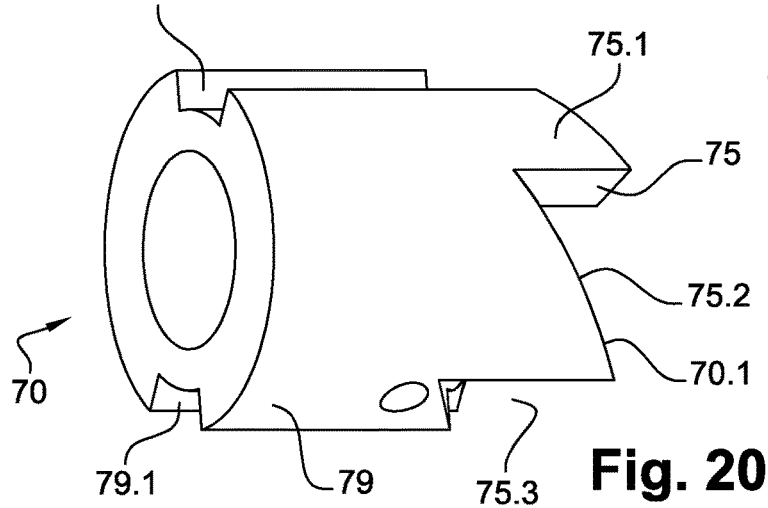
FIG. 20 is a detail view in perspective of a plunger of the FIG. 17 embodiment.
Figure 18:
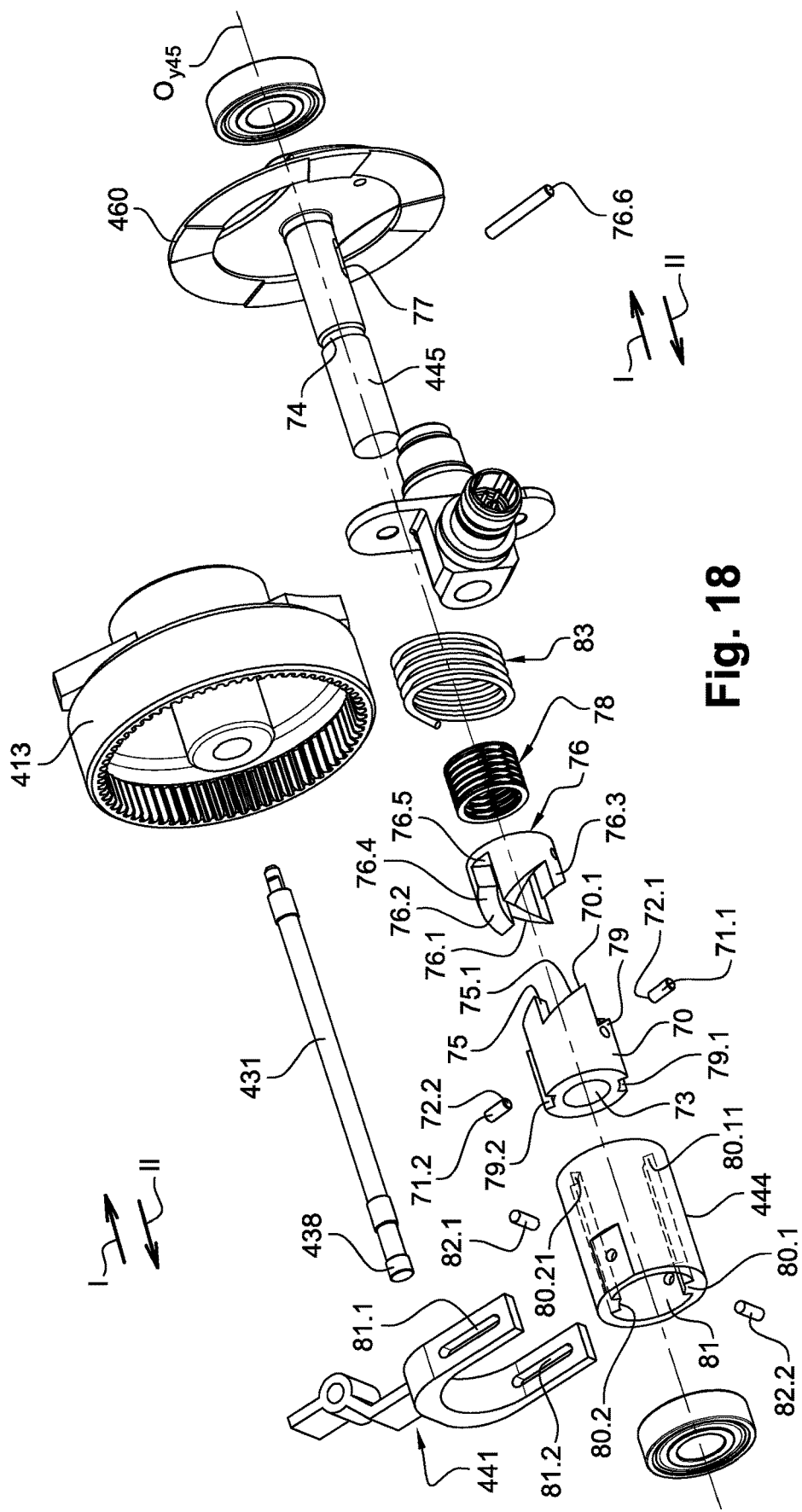
FIG. 18 is an exploded perspective view of the FIG. 17 passive locking device.

With reference to FIGS. 17 to 19, and in a fifth embodiment of the invention, the movement conversion means of the passive locking device 440 comprise a tubular plunger 70 rotatably mounted on the first shaft 445 by two half-pins 71.1 and 71.2 having respective ends 72.1 and 72.2 projecting radially from the inner surface 73 of the plunger 70 and co-operating with a circumferential groove 74 in the first shaft 445. The first end 70.1 of the plunger 70 defines a spiral-type cam profile 75 comprising an alternation of teeth 75.1, of inclined ramps 75.2, and of grooves 75.3 facing the first end 76.1 of a cam body 76. The first end 76.1 of the cam body 76 defines a spiral-type cam profile 76.2 that comprises an alternation of teeth 76.3, of inclined ramps 76.4, and of grooves 76.5.

The cam body 76 is of tubular cylindrical shape and it is connected to the first shaft 445 by a radial fin 76.6 engaged in an opening 77 that extends in the first shaft 445 parallel to its axis of rotation $O_{445}$. The first end 70.1 of the plunger 70 is pressed against the first end 76.1 of the cam body 76 by a helical spring 78 extending around the first shaft 445 and bearing firstly against the second end 76.6 of the cam body 76 and secondly against the lock 460. The outer surface 79 of the plunger 70 has two diametrically opposite grooves 79.1 and 79.2 that extend parallel to the axis $O_{445}$. The grooves 79.1 and 79.2 co-operate in sliding with respective stops 80.1 and 80.2 projecting from the inner surface 81 of the second bushing 444. The sloping ends 80.11 and 80.21 of the stops 80.1 and 80.2 are engaged in the grooves 76.5 of the cam body 76. The teeth 443.1 and 443.2 of the second end 443 of the lever 441 have respective grooves 81.1 and 81.2 that co-operate respectively with pins 82.1 and 82.2 projecting from the second bushing 444. A spring extends around the plunger 70, the cam body 76, and the spring 78, and it bears firstly against the lock 460 and secondly against the second bushing 444 in order to urge the second bushing 444 towards the first end 445.1 of the first shaft 444.

The respective cam profiles 75 and 76.2 of the plunger 70 and of the cam body 76 are arranged so as to convert a movement in translation of the second bushing 444 in a first axial travel direction—in this example from the first end 445.1 of the first shaft 445 towards its second end 445.2—in order to cause the first shaft 445 to turn relative to the second bushing 444. This movement conversion takes place in six steps. In a first step, the movement of the lever 441 actuated by the second end 438 of the rod gives rise to a movement in translation of the second bushing 444 on the first shaft 445 in the first direction I until the ends 80.11 and 80.21 of the stops 80.1 and 80.2 are disengaged respectively from the grooves 76.5, thereby releasing the cam body 76 to turn relative to the plunger 70. In a second step, the spring 78 pushes the cam body 76 against the cam profile 75. Under the effect of thrust from the spring 78, the respective slopes of the cam profiles 76.2 and 75 cause the cam body 76 to turn relative to the plunger 70 and to the second bushing 444 until the longitudinal faces of the teeth 75.1 of the plunger 70 come into contact with the flanks of the teeth 76.3 of the cam body 76, i.e. after turning through 90°. In a third step, when the rod 431 returns to its retracted first position, the spring 83 pushes the second bushing 444 towards the first end 445.1 of the first shaft 445 in the second direction II opposite to the first direction I. The ends of the teeth 75.1 of the plunger 70 come flush with the surfaces of the teeth 76.3 and contact of the sloping ends 80.11 and 80.21 of the stops 80.1 and 80.2 against the ramp 76.4 of the cam body 76, in combination with the thrust from the spring 83, causes the cam body 76 (and thus the first shaft 445) to turn relative to the second bushing 444 until the longitudinal faces of the stops 80.1 and 80.2 come into contact with the flanks of the teeth 76.3 of the cam body 76, i.e. rotation through an additional 90°. The spring 78 pushes the cam body 76 towards the plunger 70 and the stops 80.1 and 80.2 become engaged in the grooves 76.5, thereby preventing the first shaft 445 from turning relative to the second bushing 444. The first shaft 445 is blocked in position and has turned through 180°. At the end of this third step, the lock 460 has changed state.

In a fourth step, the rod 431 moving once more to its deployed second position causes the second bushing 444 to move in the first direction I until the sloping ends 80.11 and 80.21 of the stops 80.1 and 80.2 become flush with the ends of the teeth 76.3, thereby releasing the cam body 76 to turn relative to the second bushing 444. Under thrust from the spring 78, the sloping ends 80.11 and 80.21 of the steps 80.1 and 80.2 co-operate with the sloping ramps 76.4 of the cam body 76 and cause the cam body 76 (and thus the first shaft 445) to turn relative to the second bushing 444 until the longitudinal faces of the teeth 75.1 of the plunger 70 come into contact with the flanks of the teeth 76.3 of the cam body 76, facing the grooves 76.5 (fifth step). The first shaft 445 has then turned through 90° relative to the second bushing 444.

In a sixth step, when the rod 431 returns to its retracted first position, the spring 83 pushes the second bushing 444 towards the first end 445.1 of the first shaft 445 in the second travel direction II. The ends of the teeth 75.1 of the plunger 70 come flush with the surfaces of the teeth 76.3, and contact of the sloping ends of the stops 80.1 and 80.2 against the ramps 76.4 of the cam body 76 causes the cam body 76 (and thus the first shaft 445) to turn relative to the second bushing 444 until the longitudinal faces of the stops 80.1 and 80.2 come into contact with the flanks of the teeth 76.3 of the cam body 76, i.e. after turning through 90°. The spring 78 pushes the cam body 76 towards the plunger 70 and the stops 80.1 and 80.2 become engaged in the grooves 76.5 and prevent the first shaft 445 from turning relative to the second bushing 444. The first shaft 445 is blocked in position and has turned through 180°. At the end of this sixth step, the lock 460 has changed state.

This provides an actuator 401 provided with a passive locking device 440 that changes state when the tube 402 is taken beyond its retracted position.

The rod 431, the lever 441, the second bushing 444, the plunger 70, the cam body 76, the stops 80.1 and 80.2 and also the springs 78 and 83 of the passive locking device 440 constitute movement conversion means arranged to convert a movement of the tube 402 beyond its retracted first position into a turning movement suitable for causing the lock 460 to go from one of its locked first position or unlocked second position to the other one of its locked first position or unlocked second position.

Figure 21:
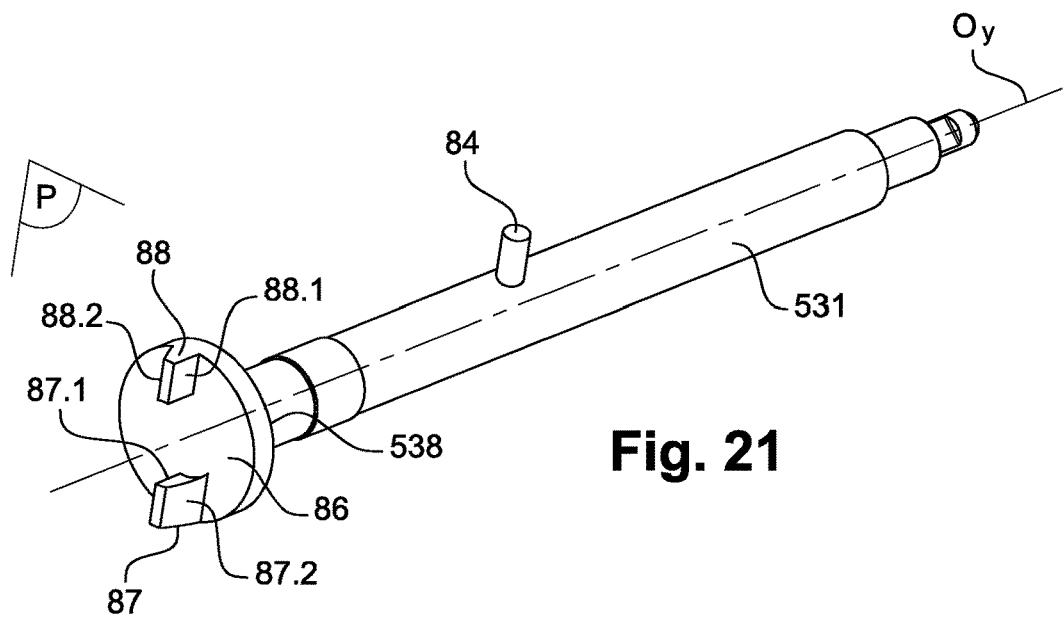
FIG. 21 is a detail view in perspective of a rod in a sixth embodiment of the invention.
Figure 23:
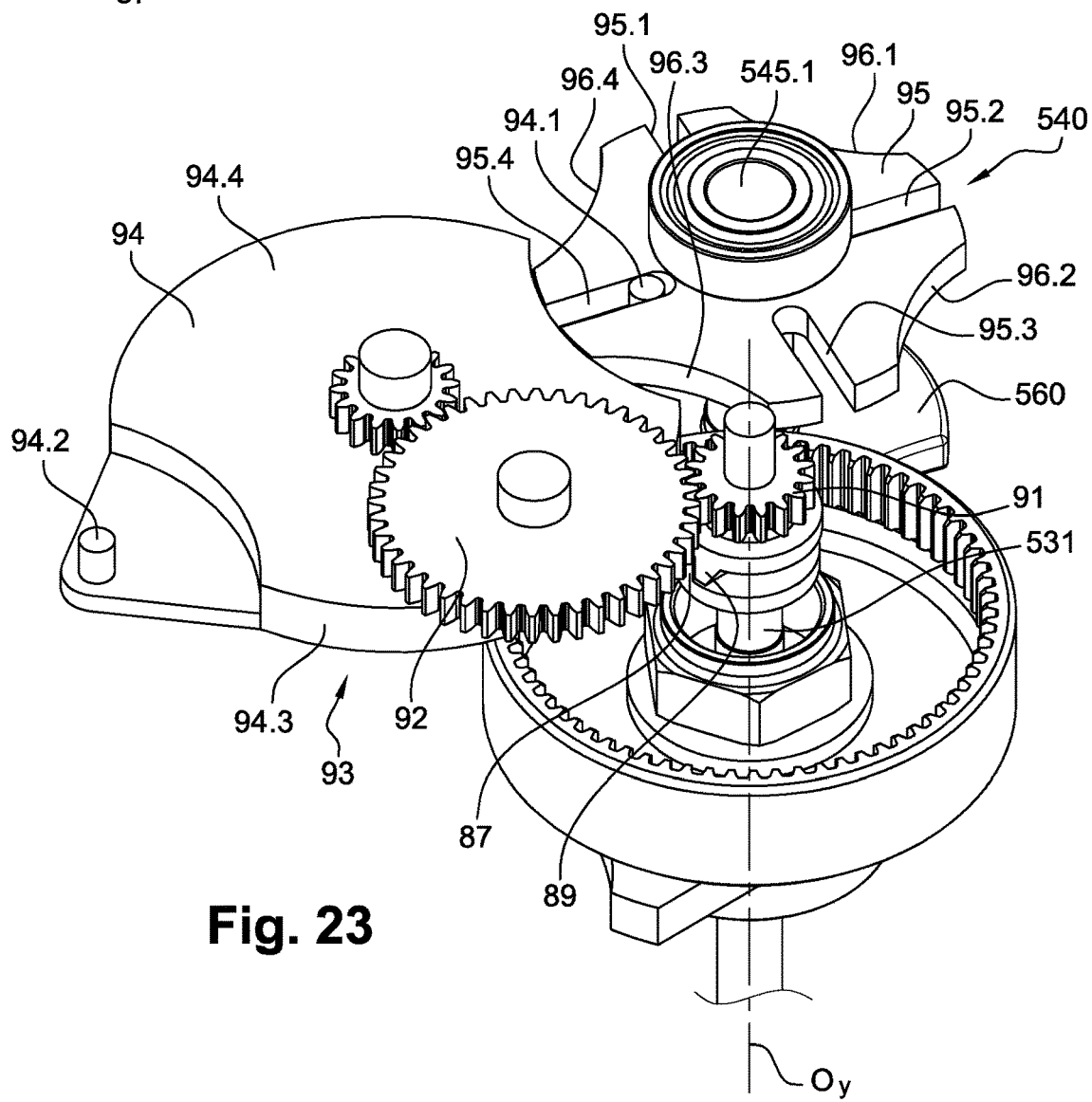
FIG. 23 is a diagrammatic detail view in perspective of a passive locking device in a sixth embodiment of the invention, the passive locking device being in a second position.

With reference to FIGS. 21 to 23, and in a sixth embodiment of the invention, the movement conversion means of the passive locking device 540 comprise a finger 84 projecting from the rod 531 in a direction that is substantially orthogonal to the longitudinal axis Oy. This finger 84 co-operates with a helical groove 85 in the housing 530 that describes a helix through 180° around the longitudinal axis Oy. The second end 538 of the rod 531 has a disk 86 extending in a plane P that is substantially orthogonal to the longitudinal axis Oy. Two first dogs 87 and 88 project longitudinally from the disk 86 and possess respective first faces 87.1 and 88.1 that extend orthogonally to the plane P, and respective second faces 87.2 and 88.2 forming respective acute angles with the first faces 87.1 and 88.2. The first dogs 87 and 88 are arranged to co-operate with two corresponding second dogs 89 and 90 projecting from the bottom face of a pinion 91 carried by the body 508 and extending to a distance d from the plate 86. The distance d is such that the first dogs 87 and 88 are disengaged respectively from the second dogs 89 and 90 when the rod 531 is in its retracted first position. The first dogs 87 and 88 are engaged respectively with the second dogs 89 and 90 when the rod 531 moves to its retracted first position.

The pinion 91 meshes with a gearwheel 92 of driving gearing 93 co-operating with a drive wheel 94 carrying two diametrically opposite fingers 94.1 and 94.2 that project from a disk 94.3 in a direction parallel to the longitudinal axis Oy. The drive wheel 94 co-operates with a driven wheel 94 of the Maltese cross type, itself known, having four slots 95.1 to 95.4. The driven wheel 95 is constrained to turn with the first end 545.1 of the first shaft 545 and it carries the lock 560 at its second end 545.2.

As can be seen in FIGS. 22 and 23, the portions 96.1 to 96.4 of the driven wheel 95 lying between two successive slots 95.1 to 95.4 describe a rounded concave curve for co-operating with rounded convex portions 94.3 and 94.4 extending between the fingers 94.1 and 94.2 of the drive wheel 94.

In operation, with the lock 560 initially in its locked position as shown in FIG. 22, the tube 502 is taken beyond its retracted first position towards its retraction overtravel third position. The rod 531 then passes from its retracted first position to its deployed second position. During this travel, the first dogs 87 and 88 of the rod 531 engage the second dogs 89 and 90 of the pinion 91 before the travel of the finger 84 in the helical groove 85 causes the rod 531 to turn about the longitudinal axis Oy. Turning of the rod 531 in a first direction has an amplitude of 180° and is transmitted to the pinion 91, thereby causing the drive wheel 94 to turn. The transmission ratio of the gearing 93 is such that it transforms the 180° turn of the pinion 91 into turning through 90° of the drive wheel 94. The finger 94.1 engaged in the slot 95.4 causes the driven wheel 95 to turn through 90°, thereby bringing the locking device 540 into the configuration shown in FIG. 22, in which the lock 560 has changed state to pass from its locked position to its unlocked position. The portion 96.4 of the driven wheel 96 is in contact with the portion 94.3 of the drive wheel 94 and provides stability for the angular position of the first shaft 545. A friction ferrule 97 situated between the pinion 91 and the body 508 can improve the stability of the unlocked position of the lock 560. When the tube 502 is taken from its retraction overtravel third position to its retracted first position in order to be deployed, the rod 531 returns to its retracted first position and turns through 180° in a second direction opposite to the first. This turning is not transmitted to the pinion 31 because of the slopes of the surfaces 87.2 and 88.2 of the first dogs 87 and 88 co-operating with the corresponding surfaces of the second dogs 89 and 90.

During retraction of the tube 502 from its deployed second position towards its retracted position followed by going beyond its retracted position, the above steps are reproduced and the lock 560 changes state to pass from its unlocked second position to its locked first position, in which the lock 560 prevents the ring 513 from turning.

The rod 531, its first dogs 87 and 88 together with the finger 84, the groove 85, the lever 541, the second bushing 544, the pinion 91, and its second dogs 89 and 90, the gearing 93 and the driven wheel 95 of the passive locking device 540 constitute second movement conversion means arranged to convert a movement of the tube 502 beyond its retracted first position into a turning movement suitable for causing the lock 560 to pass from a first one of its locked first position or unlocked second position to the other one of its locked first position or unlocked second position.

A variant of the sixth embodiment that constitutes a seventh embodiment is shown in FIGS. 24 and 25. The passive locking device 640 comprises a cam wheel 668 secured to the first shaft 645 and acting on the first end 669.1 of a latch 669 pivotally mounted on the body 608 and having its second end 669.2 co-operating selectively with the abutment 613.1 or 613.2. The cam 668 and the driven wheel 95 are arranged in such a manner as to cause the lock 660 to pass selectively from a first one of its first and second positions to the other one of its first and second positions when the first shaft 645 turns through 90° as a result of the rod 531 turning.

Figure 26:
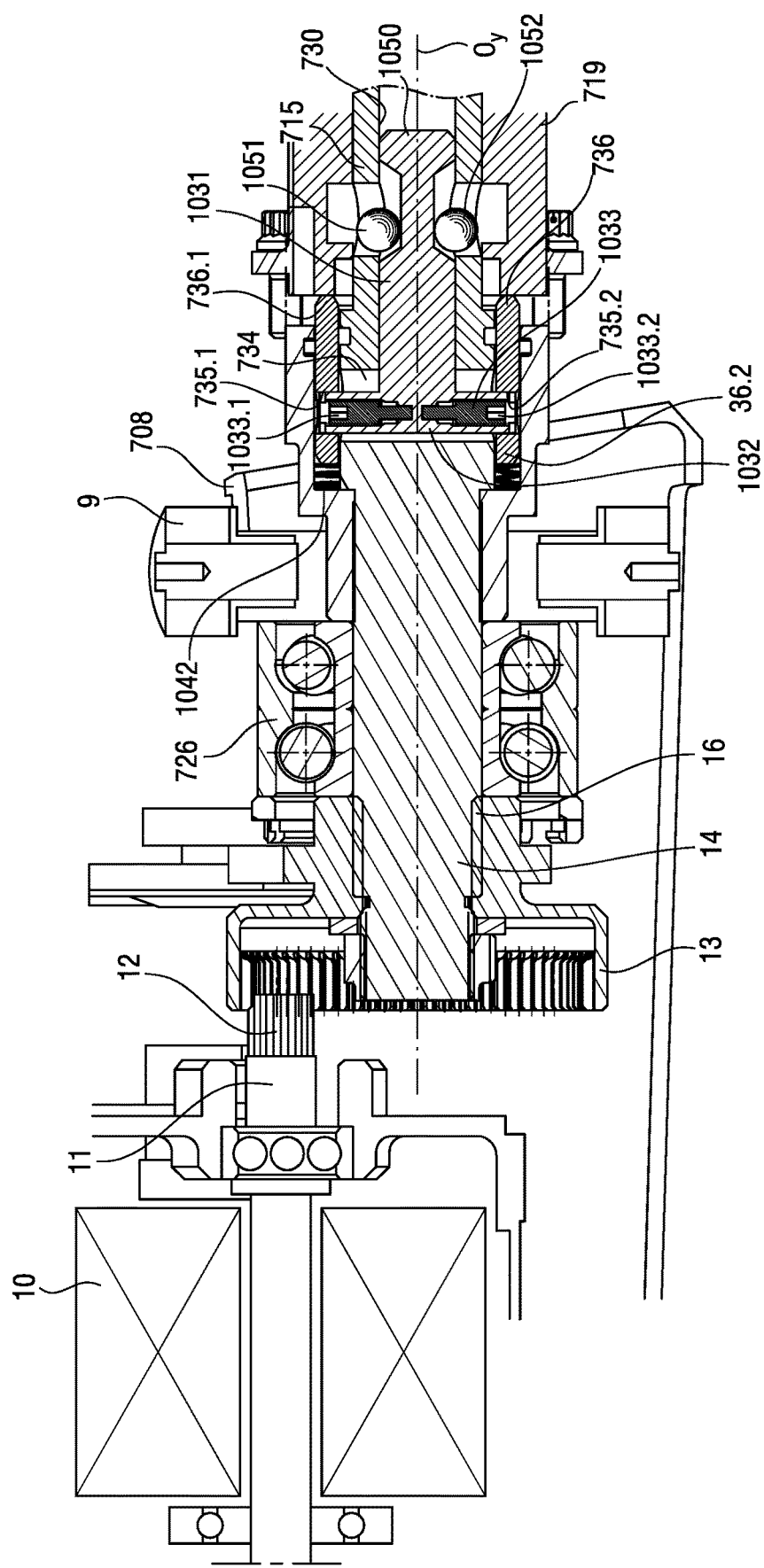
FIG. 26 is a fragmentary diagrammatic view in section of an eighth embodiment of the actuator of the invention in a retracted position.

In an eighth embodiment, and as can be seen in FIG. 26, the screw 715 has a central housing 730 extending along the longitudinal axis Oy and in which a ferromagnetic slide 1031 is slidably mounted. At its first end 1032, the slide 1031 has a first portion 1033 extending in a bore 1034 passing through the screw 715 in a direction that is substantially orthogonal to the longitudinal axis Oy. The top and bottom ends 1033.1 and 1033.2 (as shown in FIG. 3) of the first portion 1033 are respectively fitted in a top bore 735.1 and in a bottom bore 735.2 of a first bushing 736 slidably mounted along the longitudinal axis Oy on the screw 715.

The slide 1031 also has a frustoconical portion 1037 having its outer surface 1037.1 constituting a first face of a peripheral groove 1038. The groove 1038 also has a bottom 1039 defined by the outer face of a cylindrical portion 1040 of the slide 1031 and a second face 1041.1 facing the first face 1037.1 and defined by a second frustoconical portion 1041 of the slide 1031.

Figure 27:
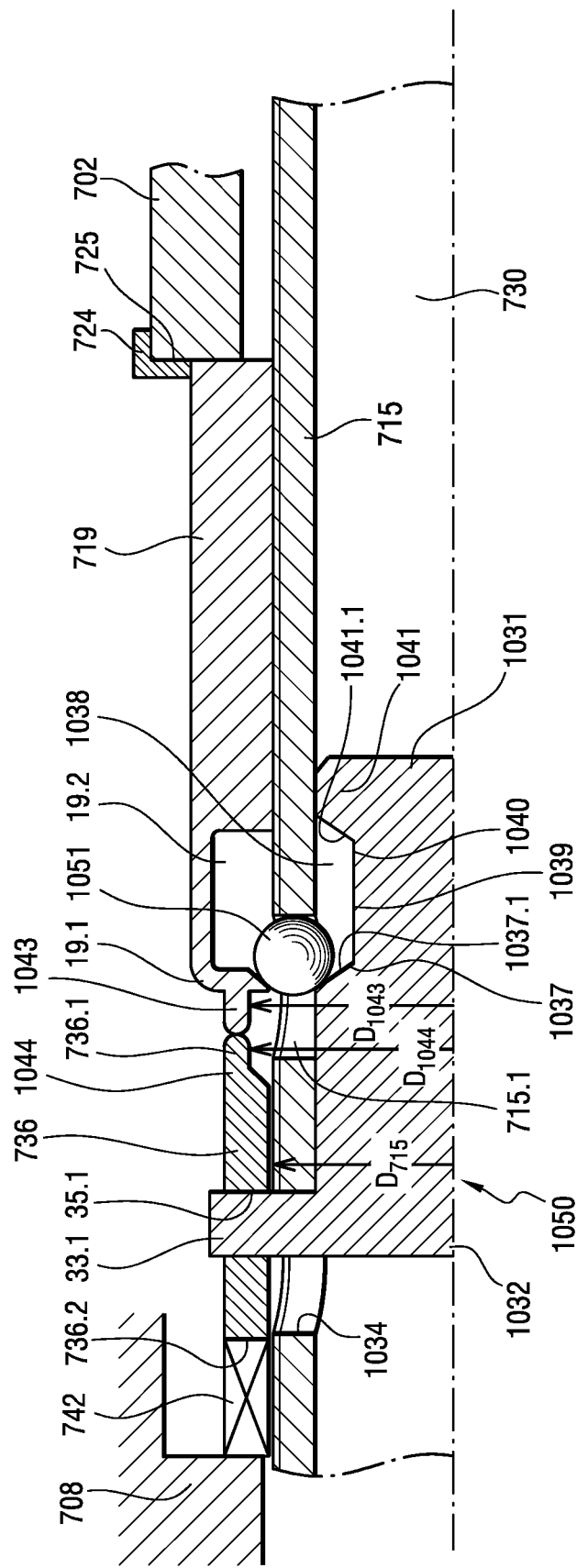
FIG. 27 is a diagrammatic detail view partially in section of a passive locking device in the eighth embodiment of the invention, the passive locking device being in a first position.

As can be seen in FIG. 27 et seq., the first end 19.1 of the nut 19 has an internally chamfered internal groove 19.2 and the bushing 736 has a first end 736.1 against which the nut 719 comes into contact when it is in its retracted first position. An annulus 1042 made of EPDM extends around the screw 715 between the body 708 and the second end 736.2 of the first bushing 736. A first annular bearing portion 1043 projects longitudinally from the first end 19.1 of the nut 19. This first portion 1043 has an inside diameter $D_{1043}$ that is greater than the outside diameter $D_{715}$ of the screw 715. A second annular bearing portion 1044 projects longitudinally from the first end 736.1 of the first bushing 736. This second portion 1044 has an inside diameter $D_{104}$ greater than the outside diameter $D_{715}$ of the screw 715 and it is arranged to bear against the first portion 1043 when the nut 719 is in its retracted first position, as shown in FIG. 27.

The actuator 1 has a passive locking device 1050 for locking the tube 702 in the retracted position. In addition to the slide 1031, this device 1050 comprises the first bushing 736 and the annulus 1042, two balls 1051 and 1052 received respectively in a first through opening 15.1 and a second through opening 15.2 in the screw 715. The balls 1051 and 1052 co-operate with the slide 1031 to occupy selectively a first position in which the balls 1051 and 1052 project partially from the outside surface 15.3 of the screw 715 or a second position in which the balls 1051 and 1052 are retracted relative to the outer surface 15.3 of the screw 715.

The slide 1031, the first bushing 36, and the annulus 1042 of the passive locking device 1050 constitute means for actuating the balls 1051 and 1052 that are arranged to cause the balls 1051 and 1052 to pass selectively from one of their first or second positions to the other one of their first or second positions.

The operation of the actuator 701 of the invention is described in detail with reference to FIGS. 27 to 36. When the tube 702 is in its retracted first position (FIG. 5), the annulus 1042 pushes the first bushing 736 into a deployed position in which the portion 1033 of the slide 1031 is held in abutment against a wall portion of the bore 734 opposite from the first end 714 of the screw 715. When the first bushing 736 is in this deployed first position, the slide 1031 is in a deployed first position in which the balls 1051 and 1052 are in their first position projecting partially from the outer surface 15.3 of the screw 715. In this first position, the balls 1051 and 1052 extend in part in the groove 19.2 and they prevent relative turning between the screw 715 and the nut 719 which would lead to the nut 719 moving in translation towards the right as shown in FIG. 27, i.e. would lead to a deployment of the tube 702. The balls 1051 and 1052 thus constitute a lock 760, in this example in its locked first position for preventing relative rotation between the screw 715 and the nut 719. It should be observed that the groove 19.2 has a width that is equal to substantially twice the diameter of the balls 1051 and 1052.

Figure 28:
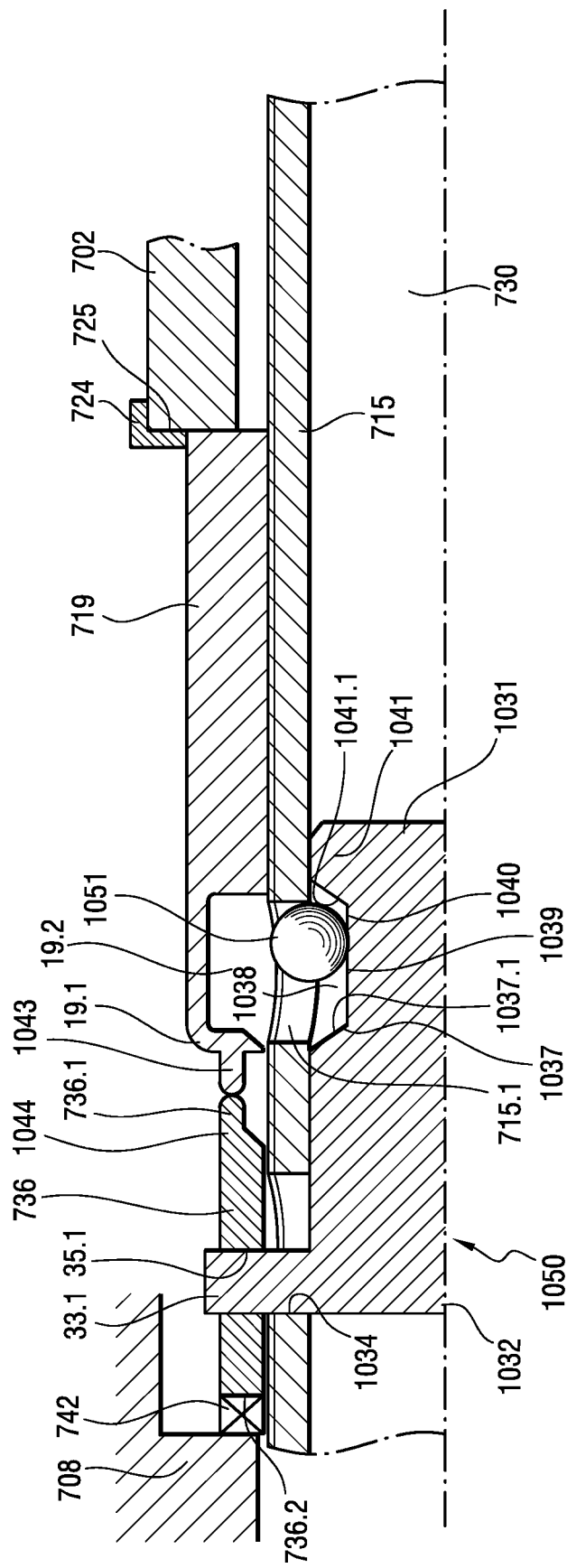
FIGS. 28 to 36 are diagrammatic detail views, partially in section, of the passive locking device of FIG. 29 in various positions.
Figure 29:
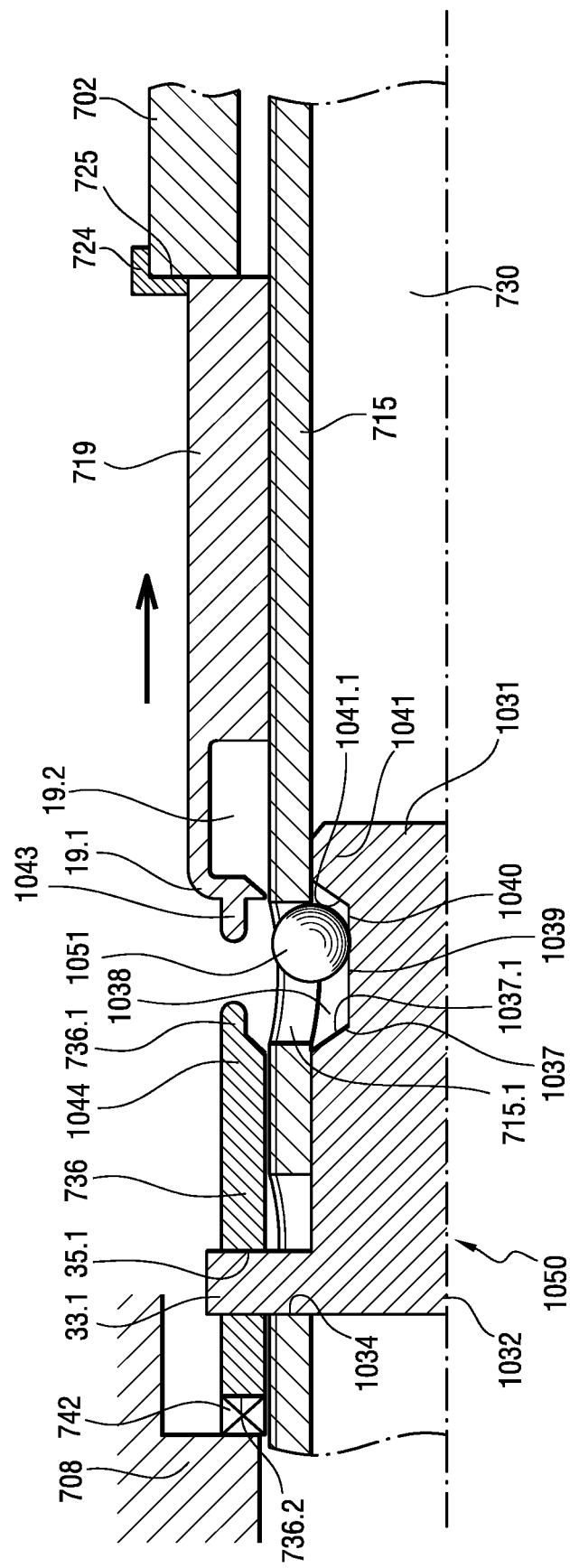
Figure 30:
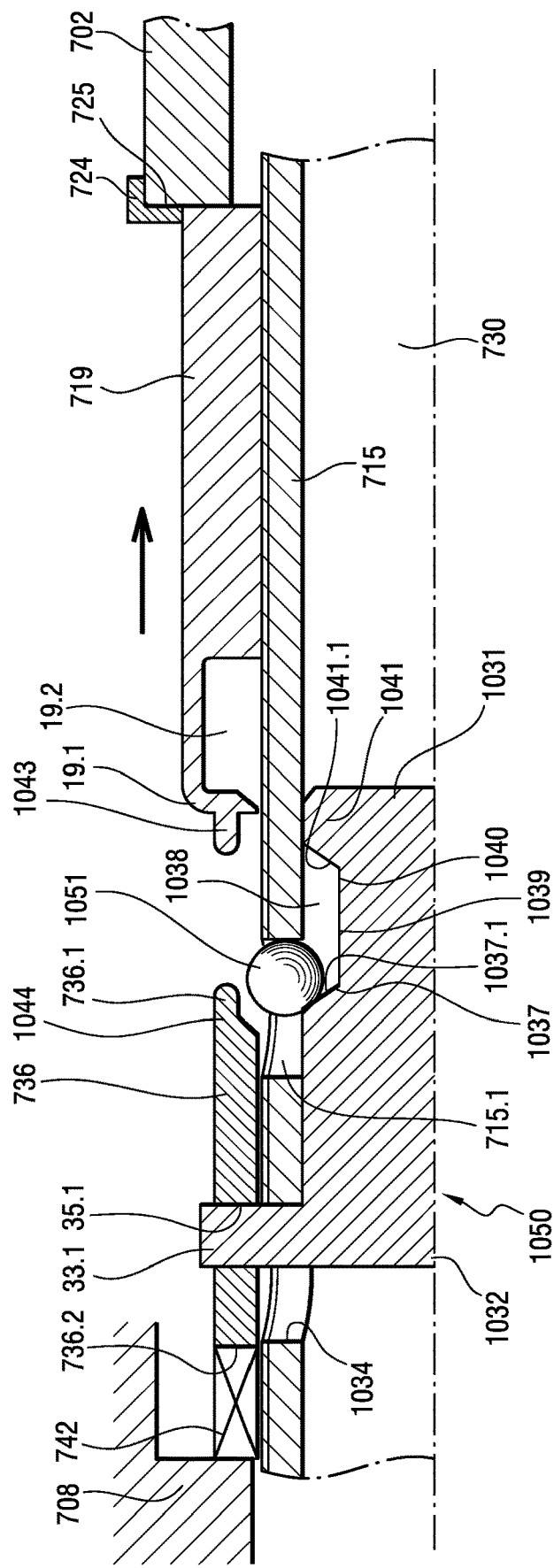

When it is desired to bring the extension tube 702 to its deployed first position (FIG. 6), the electric motor 710 is operated to move the extension tube 702 beyond its retracted first position—i.e. towards a retraction overtravel third position, and the nut 719 moves towards the left as shown in FIG. 27, thereby causing the first bushing 736 to move in translation against the force from the annulus 1042. During this movement, the slide 1031 goes from its deployed first position (as shown in FIG. 27) to its retracted second position (as shown in FIG. 28). The balls 1051 and 1052 are no longer in contact with the face 1037.1 and they come into contact with the bottom 1039 of the groove 1038 in the slide 1031, passing into their unlocked second position, as shown in FIG. 28. In parallel, the control unit actuates opening of the main locking system for locking the movable surface 705. The electric motor 710 is then operated to bring the extension tube 702 from its retraction overtravel third position to its deployed second position, the nut 719 moving on the screw 715 (to the right as shown in FIG. 29) and the first portion 1043 of the nut 719 separating from the second portion 1044 of the first bushing 736. The annulus 1042 is no longer subjected to the compression force from the first bushing 736 but it does not return immediately to its initial shape because of the viscoelastic properties of EPDM which introduce a "time delay" in the return of the annulus 1042 to its initial shape. The material of the annulus 1042 is selected so that the groove 19.2 in the nut 719 no longer faces the openings 15.1 and 15.2 in the screw 715 when the annulus 1042 returns to its initial shape and pushes the first bushing 736 into its deployed position. In this configuration, the balls 1051 and 1052 project from the screw 715 (FIG. 30).

Figure 31:
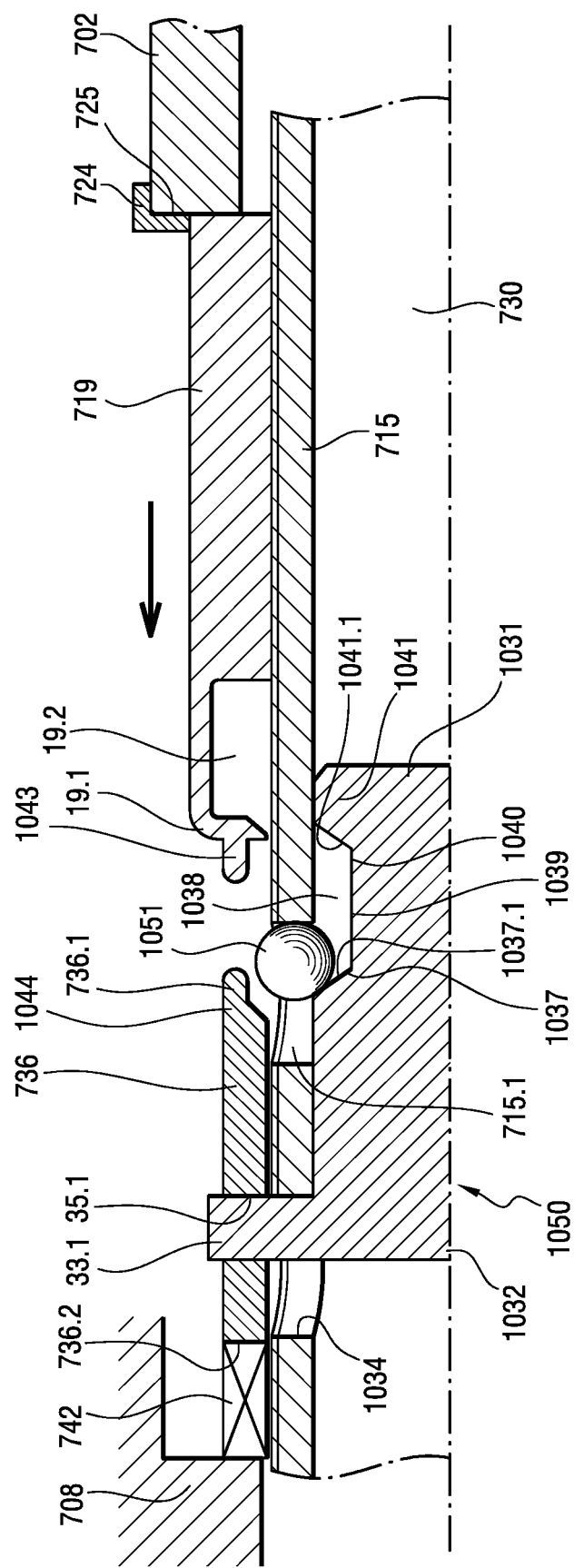

When it is desired to retract the actuator 701, the electric motor 710 is caused to rotate so as to move the tube 702 from its deployed second position to its retracted first position, and the nut 719 moves to the left as shown in FIG. 31.

Figure 32:
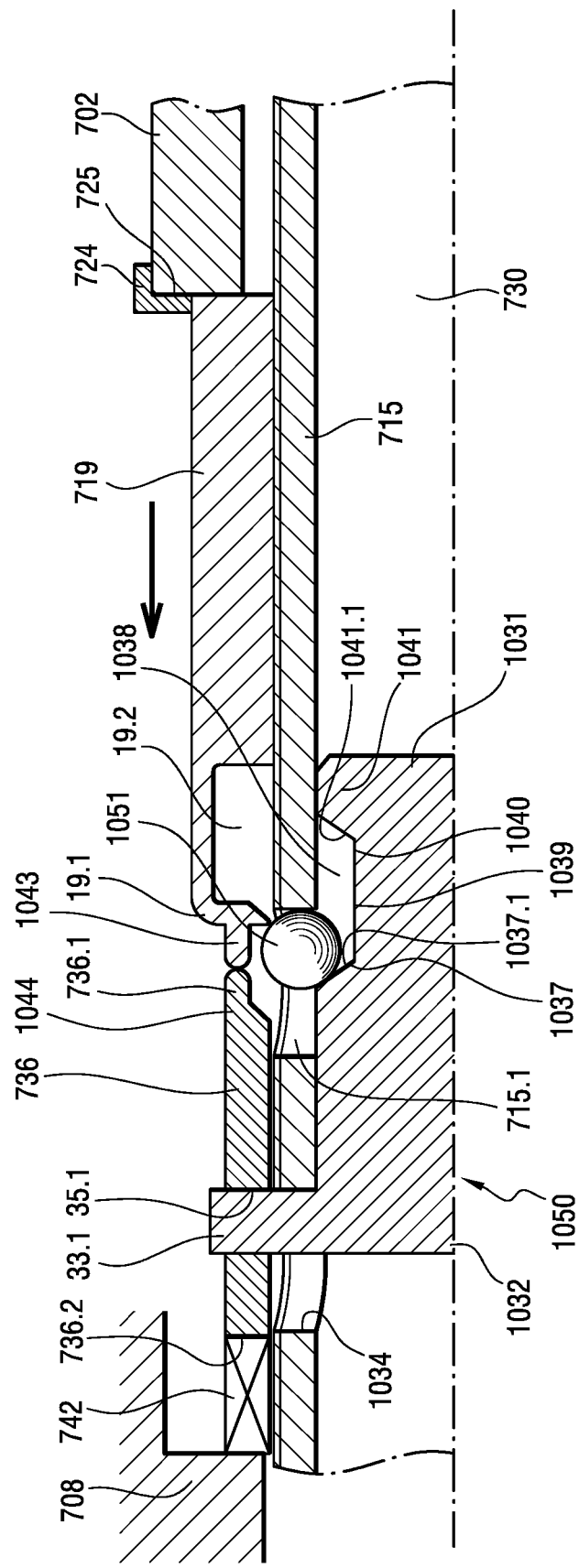
Figure 33:
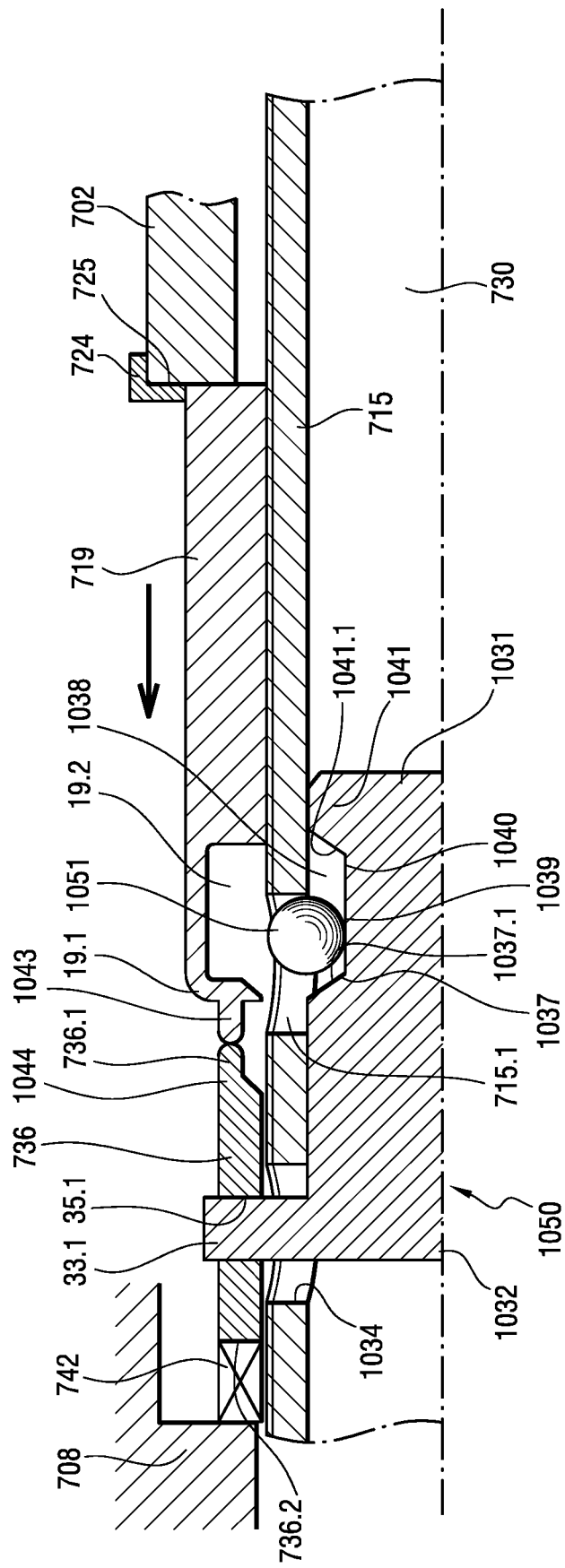
Figure 34:
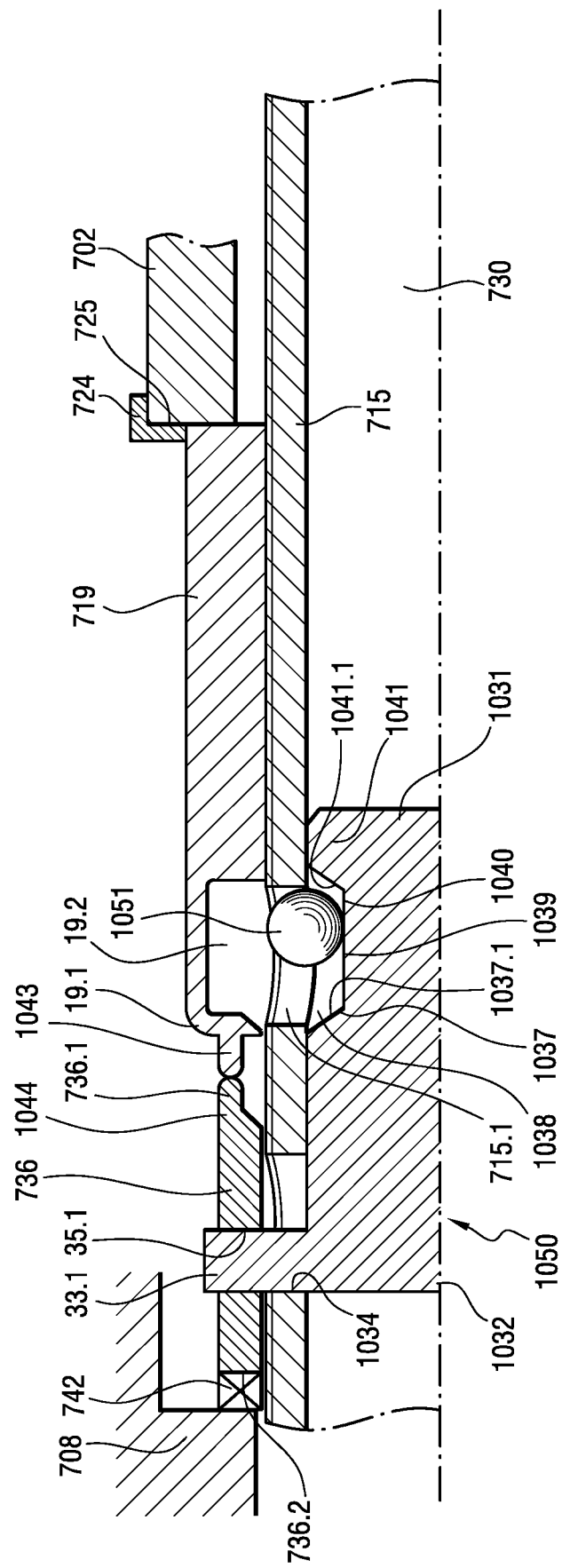
Figure 35:
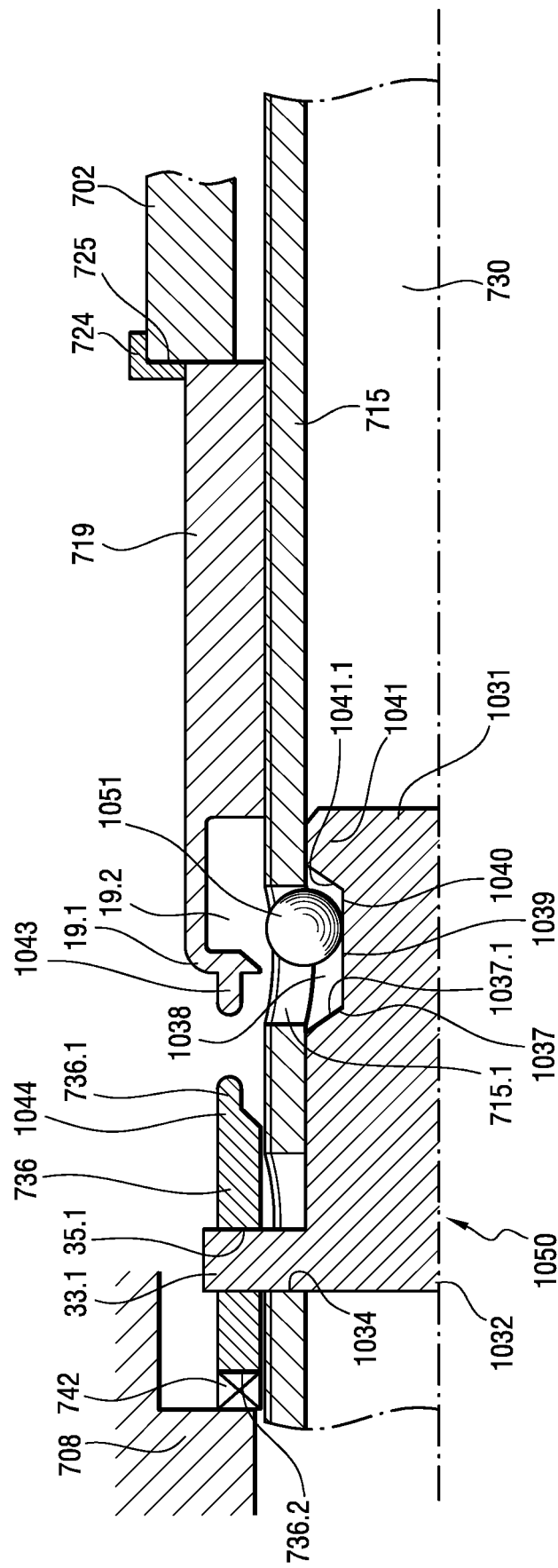
Figure 36:
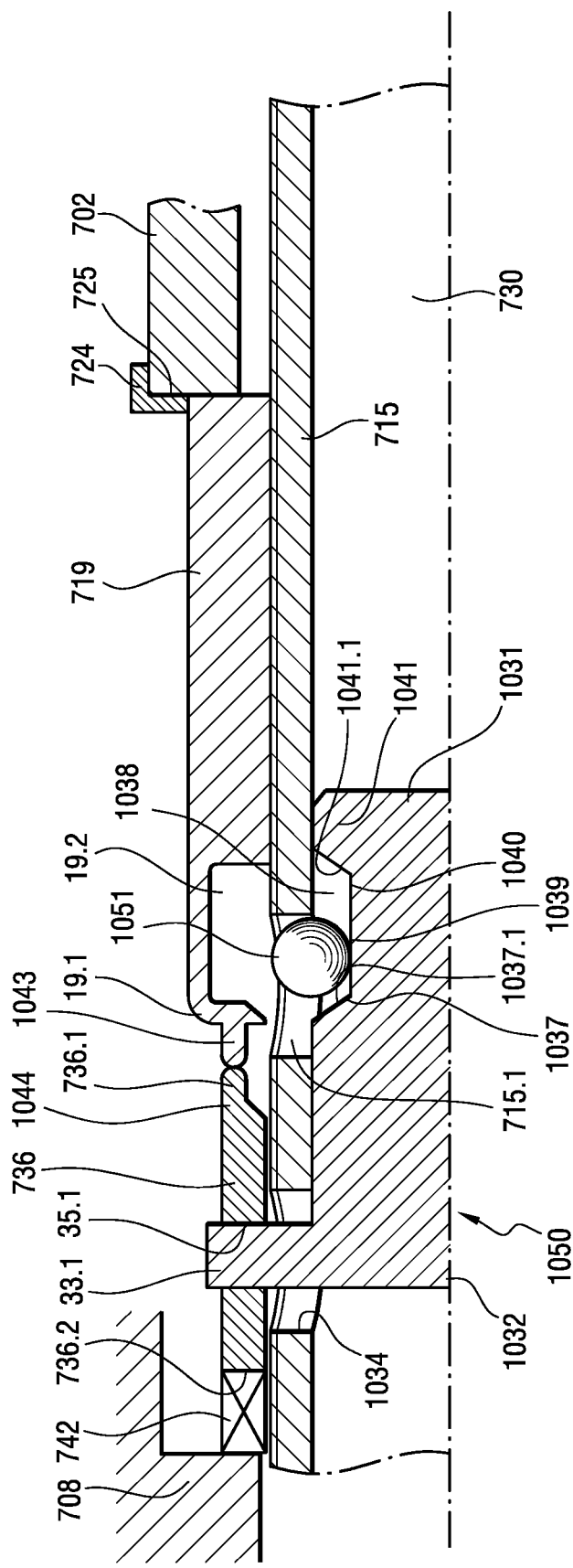

On coming a little in front of its retracted first position (situation shown in FIG. 32), the first portion 1043 of the nut 719 comes into contact with the second portion 1044 of the first bushing 736. The nut 719 continues to move in translation towards its retracted first position and causes the first bushing 736 to move in translation against the force from the annulus 1042 towards the left as shown in FIG. 32. The slide 1031 then passes into its retracted second position and the balls 1051 and 1052 pass into their second position (FIG. 33). In this position, the groove 19.2 is in register with the openings 15.1 and 15.2. The electric motor 710 is then caused to rotate so as to move the tube 702 towards its retraction overtravel third position, and the nut 719 moves towards the left as shown in FIG. 33, causing the first bushing 736 to move in translation against the force from the annulus 1042. In parallel, the control unit actuates closure of the main locking system for locking the movable surface 705. The motor 710 is then caused to rotate so as to bring the tube 702 from its retraction overtravel third position to its retracted first position (FIGS. 34 and 35). Once enough time has elapsed to enable the annulus 1042 to return into its initial position, the slide 1031 moves back into its deployed first position (as shown in FIG. 36). The balls 1051 and 1052 occupy their first position projecting from the outer surface 15.3 of the screw 715 and they prevent relative turning between the screw 715 and the nut 719, which would lead to the nut 719 moving in translation to the right as shown in FIG. 27, i.e. to the tube 702 being deployed.

An actuator 701 is thus obtained that is provided with a passive locking device that changes state when the tube 702 is taken beyond its retracted position. In the meaning of the present application, the locking device is said to be "passive" since the change of state of the lock does not require a dedicated actuator, thereby leading to a device that is more compact, more reliable, and lighter in weight.

Naturally, the invention is not limited to the embodiments described but covers any variant coming with the ambit of the invention as defined as by the claims.

In particular:
- although herein the nut is connected to an extension tube, the invention applies equally to other types of element for moving, e.g. such as a pulley, a flexible drive shaft, or a belt;
- although herein the actuator has a shaft provided with a pinion meshing with a ring gear, the invention also applies to other types of pinion, e.g. a spur gear or a bevel gear, or in the form of teeth formed in the outlet shaft;
- although herein the screw is a ball screw, the invention applies equally to other types of screw, e.g. such as a flat-threaded screw, a recirculating ball screw, or a roller screw;
- although herein the screw is mounted on the ring gear by interacting splines and fluting, the invention applies equally to other means of securing the shaft with the screw, such as for example welding, brazing, keying, or a force-fit;
- although herein the first end of the screw is provided with a bronze ferrule, the invention applies equally to other types of guidance of the shaft for movement in translation, such as for example a Teflon bushing, a PTFE shoe, guidance by means of balls, or surface hardening of the contacting surfaces;
- although herein the outer face of the nut includes a key co-operating with a groove in the ferrule, the invention applies equally well to other means for preventing the nut from turning, such as for example rollers secured to the nut and engaged in openings in the sheath, or a tongue secured to the sheath engaged in a groove in the nut;
- although herein the nut is provided with internal anti-rotation means, the invention applies equally well to an actuator having no internal anti-rotation means, e.g. such as rotation of the extension tube being prevented by means of a connection to the element that is to be actuated (the movable surface in the embodiment described);
- although herein the nut is connected to the element for moving by means of a hook, the invention applies equally well to other means for connecting the nut to the element for moving, such as for example a connection involving screw fastening, mutual engagement, welding, or keying;
- although herein the ends of the lever are received in flats formed on the second bushing, the invention applies equally well to other means for preventing the second bushing turning relative to the first shaft, e.g. such as a connection between the lever and the second bushing by means of a pin, a ball joint, or indeed a pair of rollers secured to the second bushing and co-operating with openings in the body;
- although herein a compression spring extends between the body and the second end of the second bushing, the invention applies equally well to other types of means for returning the second bushing into position, e.g. such as other resilient means such as a block of elastomer or Belleville washers, a viscoelastic damper, or other return means, e.g. such as a magnet or a gravity device;
- although herein the second end of the lever is in the form of a fork, the invention applies equally well to other types of arrangement for the second end of the lever for moving the second bushing, e.g. such as one or more pins engaged in openings, resilient mutual engagement, or a ball joint;
- although herein the lock co-operates with two or four abutments on the ring gear, the invention applies equally well to some other number of abutments, e.g. one only, three, or more than four. In the same manner, the lock may possess an arbitrary number of convex and/or concave portions, such as a single portion, three portions, or more than four;
- although herein the keeper is received in a ferrule surrounded by a jacket, the invention applies equally well to other types of keeper, such as for example a keeper having a tooth and a spring, a keeper having balls and a slot;
- although herein the nut is flush with the end of the rod when it is in the retracted position, the invention applies equally to other configurations, such as for example a rod having a safety protection distance, set back in the central housing or projecting therefrom;

although herein the cam body is connected to the first shaft by a radial pin engaged in a longitudinal opening in the first shaft, the invention applies equally well to other means for providing a sliding connection, e.g. such as an opening made in the body of the cam and a pin secured to the shaft. In the same manner, the invention applies equally well to inverting the drive system of the invention in which the cam body is secured to the second bushing and the plunger is mounted to slide on the shaft;

although herein the changes of state of the lock take place for the first shaft or the rod turning through 30°, 90°, or 180°, the invention applies equally well to turning through other angles, such as for example 60°, less, or more;

although herein the rod has a finger co-operating with a groove secured relative to the central housing, the invention applies equally well to other types of means for converting movement in order to convert a movement in translation of the rod into a movement in rotation, such as for example two helical threads, a finger projecting from the housing and a groove made in the rod;

although herein the drive wheel has two fingers co-operating with four slots in the driven wheel, the invention applies equally well to a driven wheel having a single finger or more than two and/or to a driven wheel having one, two, or three slots, or more than four;

although herein the actuator is provided with an inductive sensor for detecting the position of the lock, the invention applies equally well to other types of means for detecting the position of the lock, such as for example a coder on the shaft, an optical sensor, or no sensor;

although herein an EPDM annulus extends between the body and the second end of the second bushing, the invention applies equally well to other types of means for returning the slide into position and arranged to hold it in its retracted second position for a determined duration before returning the slide to its deployed first position, e.g. such as other types of elastomer, a gas damper, a spring coupled to a damper, or a time delay provided by a hydraulic damper;

although herein the lock has two balls, the invention applies equally well to some other number of balls, e.g. a single ball, three balls, or more than four. In the same manner, other types of lock could be used such as teeth, rollers, or cams actuated by the slide;

although herein the lock prevents the nut from moving relative to the screw or the screw from moving relative to the body, the invention applies equally well to other types of means for preventing relative turning between the screw and the nut, e.g. blocking the motor shaft relative to the body or blocking the extension tube relative to the screw or to the body;

although herein the balls are pushed back by a chamfer of the groove, the invention applies equally well to other means for returning the balls to the bottom of the groove, such as for example a resilient ring, a spring extending between the ball and the slide, making use of the force of gravity, or a cage for retaining the balls;

although herein the actuator includes a universal joint, the invention applies equally well to other types of connection between the actuator and the aircraft, e.g. such as ball joint.

The solutions developed in the various embodiments may be combined with one another in order to obtain cumulative or synergetic effects. For example, each embodiment could be provided with means for detecting the state of the lock even though only one of the embodiments mentions the presence of such means. The same applies to the configurations of the lock, of the central housing, etc.

The invention claimed is:

1. A lockable electromechanical actuator comprising:
a body;
a motor having its outlet shaft constrained to rotate with a screw extending along a longitudinal axis (Oy);
a nut engaged on the screw and provided with connection means for connection to an element that is to be moved, the nut moving on the screw from a retracted first position of the nut to a deployed second position of the nut corresponding respectively to a retracted first position of the element that is to be moved and to a deployed second position of the element, that is to be moved; and
a passive locking device for locking the element that is to be moved in the retracted position;
the passive locking device comprising one of the means for actuating a lock being capable of selectively adopting a first position in which the lock prevents relative turning between the screw and the nut that would lead to the element that is to be moved being deployed and a second position in which relative rotation between the screw and the nut is free; and
the passive locking device being arranged so that:
when the lock is in its first position, the lock passes from the first position to the second position when the element that is to be moved is taken beyond its retracted position; and
when the lock is in its second position, the lock passes from the second position to the first position when the element that is to be moved is taken beyond its retracted position.

2. The electromechanical actuator according to claim 1, wherein the actuator means comprise movement conversion means arranged to convert movement of the element that is to be moved beyond its retracted first position into a movement in rotation suitable for causing the lock to pass from one of its first and second positions to the other one of its first and second positions.

3. The electromechanical actuator according to claim 2, wherein the outlet shaft of the motor is provided with a pinion meshing with a ring having internal teeth, and the screw is constrained to turn with the ring;
the passive locking device includes an abutment carried by the ring for the purpose of co-operating with the lock, and the lock is functionally connected to the nut, being arranged to prevent turning of the ring when the lock is in its first position;
the movement conversion means comprise a rod slidably mounted in a central housing of the screw extending along the longitudinal axis (Oy), the rod being functionally connected to the element that is to be moved so as to pass from a retracted first position of the rod to a deployed second position of the rod when the element that is to be moved is taken beyond its retracted position;
the movement conversion means also comprise a lever pivotally mounted on the body, the lever having a first end arranged to be actuated by the rod when it passes into its deployed second position; and
the second end of the lever is arranged to move a second bushing slidably mounted on a first shaft that is constrained to turn with the lock.

4. The electromechanical actuator according to claim 2, wherein the outlet shaft of the motor is provided with a pinion meshing with a ring having internal teeth, and the screw is constrained to turn with the ring, the passive locking device includes an abutment carried by the ring for the purpose of co-operating with the lock, and the lock is functionally connected to the nut being arranged to prevent turning of the ring when the lock is in its first position;

the movement conversion means slidably mounted in a central housing of the extending along the longitudinal axis (Oy), the rod being functionally connected to the element that is to be moved so as to pass from a retracted first position of the rod to a deployed second position of the rod when the element, that is to be moved is taken beyond its retracted position; and the movement conversion means being arranged to convert a movement of the element that is to be moved beyond its retracted position into a turning movement of the rod.

5. The electromechanical actuator according to claim 3, wherein the movement conversion means also comprise a plunger rotatably mounted on the first shaft and having a first end of the plunger that co-operates with a first end of a cam body connected to the first shaft by a slideway type connection, the outer face of the plunger including at least one groove co-operating with a stop secured with the second bushing, the movement conversion means also comprising first return means for returning the second bushing into position, together with thrust means for thrusting the cam body so as to bring the first end of the cam body against the first end of the plunger.

6. The electromechanical actuator according to claim 3, wherein the first shaft has a groove extending helically along the first shaft, the second bushing being secured to a first cylindrical ferrule provided with a follower for co-operating with the groove and a keeper arranged in such a manner that:

movement of the second bushing on the first shaft in a first travel direction causes the first shaft to turn relative to the second bushing; and movement of the second bushing on the first shaft in a second travel direction opposite to the first travel direction does not cause any turning of the first shaft relative to the second bushing.

7. The electromechanical actuator according to claim 4, wherein the slideway type connection comprises a pin extending through a longitudinal opening in the first shaft.

8. The electromechanical actuator according to claim 5, wherein the first return means of the second bushing and/or the means for thrusting the cam body comprise a helical spring.

9. The electromechanical actuator according to claim 3, wherein the central housing extends over the entire length of the screw, the rod having a first end projecting from a first end of the screw.

10. The electromechanical actuator according to claim 3, wherein the central housing is blind, and wherein the rod has a first portion extending in a bore passing through the screw in a direction that is substantially orthogonal to the longitudinal axis, the first portion of the rod being connected to a first bushing slidably mounted on the screw to slide along the longitudinal axis (Oy).

11. The electromechanical actuator according to claim 3, comprising return means for returning the rod to its retracted first position.

12. The electromechanical actuator according to claim 3, comprising first return means for returning the second bushing in position.

13. The electromechanical actuator according to claim 6, wherein the follower and the groove are arranged in such a manner that movement of the second bushing on the first shaft in the first sliding direction causes the first shaft to turn through 90° relative to the second bushing.

14. The electromechanical actuator according to claim 6, wherein the follower and the groove are arranged in such a manner as to cause the lock to pass selectively from one of its first and second positions to the other one of its first and second positions when the first shaft turns through 180°.

15. The electromechanical actuator according to claim 4, wherein the rod is functionally constrained in rotation with a pinion of gearing driving a drive wheel having at least one finger for co-operating with a slot of a driven wheel of the Maltese cross type, the driven wheel being constrained to rotate with the lock.

16. The electromechanical actuator according to claim 15, wherein the driven wheel has four slots and the drive wheel has two fingers.

17. The electromechanical actuator according to claim 15, wherein the portion of the driven wheel between two successive slots describes a concave rounded curve for co-operating with a corresponding portion of the drive wheel while it is turning.

18. The electromechanical actuator according to claim 3, wherein the lock comprises a cam wheel secured to the first shaft and acting on the first end of a latch pivotally mounted on the body and having its first end co-operating selectively with the abutment.

19. The electromechanical actuator according to claim 3, wherein the lock is constrained to rotate with the first shaft and has at least one convex portion for co-operating with the abutment when the lock is in its first position and a concave portion arranged to leave the ring free to turn when the lock is in its second position.

20. The electromechanical actuator according to claim 19, wherein the convex portion is a portion of a disk having its center situated on the axis of rotation ($O_{45}$) of the first shaft.

21. The electromechanical actuator according to claim 3, wherein the movement conversion means are arranged to convert a movement of the element that is to be moved beyond its retracted position into a turning movement of the rod.

22. The electromechanical actuator according to claim 21, wherein the rod is functionally constrained in rotation with a pinion of gearing driving a drive wheel having at least one finger for co-operating with a slot of a driven wheel of the Maltese cross type, the driven wheel being constrained to rotate with the lock.

23. The electromechanical actuator according to claim 21, wherein the driven wheel has four slots and the drive wheel has two fingers.

24. The electromechanical actuator according to claim 22, wherein the portion of the driven wheel between two successive slots describes a concave rounded curve for co-operating with a corresponding portion of the drive wheel while it is turning.

25. The electromechanical actuator according to claim 3, wherein the lock comprises a cam wheel secured to the first shaft and acting on the first end of a latch pivotally mounted on the body and having its first end co-operating selectively with the abutment.

26. The electromechanical actuators according to claim 2, wherein the movement conversion means comprise a slide mounted to slide in a central housing of the screw extending along the longitudinal axis (Oy), the slide being functionally connected to the element that is to be moved in such a manner as to pass from a deployed first position of the slide to a retracted second position of the slide when the element to be moved is taken beyond its retracted position.

27. The electromechanical actuator according to claim 26, wherein the slide comprises a first portion extending in a bore crossing the screw in a direction that is substantially orthogonal to the longitudinal axis, the first portion of the slide being connected to a first bushing) slidably mounted on the screw to slide along the longitudinal axis (Oy).

28. The electromechanical actuator according to claim 26, comprising return means for returning the slide towards its deployed first position and arranged to hold the slide in its retracted second position for a predetermined duration prior to returning the slide towards its deployed first position.

29. The electromechanical actuator according to claim 26, wherein the slide comprises at least one frustoconical portion.

30. The electromechanical actuator according to claim 26, wherein the lock includes at least one ball.

31. The electromechanical actuator according to claim 26, wherein the lock is arranged to constrain the nut to rotate with the screw when the nut is in its first position.

32. The electromechanical actuator according to preceding claim 1, including detector means for detecting the position of the lock.

33. The electromechanical actuator according to claim 1, wherein the actuator means include movement conversion means arranged to convert a movement of the element that is to be displaced beyond its retracted first position into a movement in translation suitable for causing the lock to pass from one of its first and second positions to the other one of its first and second positions.

34. The electromechanical actuator according to claim 33, wherein the movement conversion means comprise a slide mounted to slide in a central housing of the screw extending along the longitudinal axis (Oy), the slide being functionally connected to the element that is to be moved in such a manner as to pass from a deployed first position of the slide to a retracted second position of the slide when the element to be moved is taken beyond its retracted position.

35. The electromechanical actuator according to claim 34, wherein the slide comprises a first portion extending in a bore crossing the screw in a direction that is substantially orthogonal to the longitudinal axis, the first portion of the slide being connected to a first bushing slidably mounted on the screw to slide along the longitudinal axis (Oy).

36. The electromechanical actuator according to claim 34, comprising return means for returning the slide towards its deployed first position and arranged to hold the slide in its retracted second position for a predetermined duration prior to returning the slide towards its deployed first position.

37. The electromechanical actuator according to claim 34, wherein the slide comprises at least one frustoconical portion.

38. The electromechanical actuator according to claim 34, wherein the lock includes at least one ball.

39. The electromechanical actuator according to claim 1, wherein the lock is arranged to constrain the nut to rotate with the screw when the nut is in its first position.

* * * * *